(12) United States Patent
Suzuki

(10) Patent No.: US 7,263,249 B2
(45) Date of Patent: Aug. 28, 2007

(54) OPTICAL ELEMENT ASSEMBLY AND METHOD OF MAKING THE SAME

(75) Inventor: Akiko Suzuki, Akishima (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 11/453,367

(22) Filed: Jun. 14, 2006

(65) Prior Publication Data

US 2006/0245041 A1    Nov. 2, 2006

Related U.S. Application Data

(62) Division of application No. 10/806,579, filed on Mar. 22, 2004, now Pat. No. 7,110,630.

(30) Foreign Application Priority Data

Mar. 27, 2003    (JP)    ............... 2003-087895

(51) Int. Cl.
*G02B 6/12* (2006.01)
*G02B 6/26* (2006.01)
(52) U.S. Cl. .................. 385/14; 385/15; 385/52
(58) Field of Classification Search .................. 385/14, 385/15, 52
See application file for complete search history.

(56) References Cited

U.S. PATENT DOCUMENTS 5,675,684 A * 10/1997 Hirataka et al. ............... 385/88

| | | | |
|---|---|---|---|
| 2001/0055447 A1* | 12/2001 | Delprat et al. ................. | 385/50 |
| 2002/0097962 A1* | 7/2002 | Yoshimura et al. ........... | 385/50 |
| 2003/0210873 A1* | 11/2003 | Moretti ......................... | 385/89 |
| 2004/0017877 A1* | 1/2004 | Hartel et al. ................. | 376/283 |
| 2004/0218870 A1* | 11/2004 | Blauvelt et al. .............. | 385/50 |
| 2005/0207695 A1* | 9/2005 | Ogawa et al. ................. | 385/14 |

FOREIGN PATENT DOCUMENTS

| | | |
|---|---|---|
| JP | 08-313756 | 11/1996 |
| JP | 09-005586 | 1/1997 |
| JP | 4005005586 A  * | 1/1997 |
| JP | 09-281360 | 10/1997 |
| JP | 2002-014258 | 1/2002 |

* cited by examiner

*Primary Examiner*—K. Cyrus Kianni
(74) *Attorney, Agent, or Firm*—Larry Mendenhall; Gallagher & Lathrop

(57) ABSTRACT

A V-groove is formed in a platform of single crystal silicon by anisotropic wet etching based on its crystal orientation, and a convexity of an optical element chip is fitted in an intermediate portion of the V-groove. Quadrangular frustoidal convexities are formed in rows and columns on a single crystal silicon wafer by anisotropic wet etching, then a photonic crystal filter element is formed as an optical element on the protruding end face of each convexity, and the wafer is cut for each optical element into individual optical element chips. When optical fibers are disposed in the V-groove at both sides of the chip, cores of the optical fibers and light inlet and outlet ports of the optical element are aligned with each other.

3 Claims, 14 Drawing Sheets

OPTICAL ELEMENT ASSEMBLY AND METHOD OF MAKING THE SAME

This Application is a division of Application, with a foreign priority number and filling date.

This is a Division of Application Ser. No. 10/806,579 filed on Mar. 22, 2004 now U.S. Pat. No. 7,110,630. The disclosure of the prior application is hereby incorporated by reference herein in its entirety.

CROSS-REFERENCE TO RELATED APPLICATION

This application claims priority under 35 USC 119 from Japanese patent document, No. 2003-087895, the disclosure of which is incorporated by reference herein.

BACKGROUND OF THE INVENTION

The present invention relates to an optical element assembly for use, for example, in the fields of optical communications, which permits highly accurate positioning of a microminiature optical element, such as a photonic crystal optical element, and an optical part, such as an optical fiber, with respect to each other. The invention also pertains to a method for the manufacture of such an optical element assembly.

In the fields of optical communications, a lot of attention has recently been given to artificial crystal materials (photonic crystals) whose refractive index changes with a period on the order of light wavelength. With the use of such photonic crystals, it is expected that advanced light-controlled functional elements which were impossible to realize in the past, such as a low-loss macrobend waveguide, a low-threshold laser and a wavelength division multiplexing element, can be fabricated in sizes of 100 μm×100 μm or smaller. With rapid progress in microfabrication technology, there have recently been made reports on prototypes of ultraminiature optical elements constructed from three- and two-dimensional photonic crystals for operation in a wavelength band for optical communications.

Slab-type photonic crystal optical waveguides are typical representatives of optical elements using the two-dimensional photonic crystals. The slab-type photonic crystals roughly fall into those of a structure in which a thin-film layer of a high refractive index material is perforated with two-dimensionally periodic arrays of air holes and those of a structure in which a thin-film layer of a low refractive index material has formed therein a two-dimensionally periodic arrays of rods of a high refractive index material. In both of the photonic crystals a photonic band gap develops when particular periodicity conditions are satisfied. By introducing air holes or an area without rods, that is, crystal defects into the periodic structure, an optical waveguide is formed which permits the propagation therethrough of light; namely, a line defect of missing holes or rods is defined to form the optical waveguide. Accordingly, the two-dimensional photonic crystals are considered as promising for realizing low-loss, ultraminiature optical waveguides.

However, since light inlet and outlet ports of such a slab type photonic crystal optical waveguide are approximately 1 μm or less in size (in thickness) that is smaller than the core diameter (about 4 to 10 μm in single mode) of an optical fiber, high-precision positioning of the waveguide and the optical fiber is difficult to achieve—this constitutes an obstacle to high-efficiency input of light to the waveguide. In the case of the optical waveguide of the photonic crystal having air holes periodically arranged in the high refractive index material layer, since light is launched into the layer from air, reflectivity on the plane of incidence is high, giving rise to a heavy coupling loss.

Particularly advantageously the optical elements using photonic crystals are ultraminiature as referred to above, but substantially no consideration has been paid to simple and effective methods for coupling the photonic crystals to optical parts which are absolutely necessary for using them as optical elements, such as an optical fiber for signal transmission, a microminiature lens and so forth, and a method for keeping the coupling loss down.

For high-precision optical coupling of an optical element and an optical fiber or similar optical part, there have widely been used methods using a V-grooved structure in a single crystal silicon substrate. A V-groove can easily be formed in single crystal silicon by what is called single crystal silicon anisotropic wet etching (hereinafter referred to simply as anisotropic etching) that makes use of an anisotropic etching characteristic of single crystal silicon based on its crystal orientation. A simple example of such a method is disclosed, for example, in Japanese Patent Application Kokai Publication Gazette No. 281360/97 (published Oct. 31, 1997, hereinafter referred to as document 1). According to this method, one end portion of an optical fiber is fixed in a V-groove of a single crystal silicon substrate and a semiconductor laser or similar optical element is directly mounted on the non-grooved substrate surface on the side opposite the optical element in alignment therewith.

Another method is proposed, for example, in Japanese Patent Application Kokai Publication Gazette No. 2002-14258 (published Jan. 18, 2002, hereinafter referred to as document 2).

With reference to FIG. 1, the proposed method will be described below in brief. A single crystal silicon wafer, which has its principal plane formed by a crystal plane (100) or (101), is subjected to photolithography and anisotropic etching in this order to form rows and columns of square concavities of the same size and each having the same shape as the outside shape of an inverted frustum of a pyramid, and the silicon wafer is diced crosswise centrally of each square concavity into a large number of optical element carriers 1. On the bottom of such an optical element carrier 1 there is formed a cross-shaped convexity 2 resulting from the formation of each square concavity by anisotropic etching. Each side surface of the cross-shaped convexity 2 is tapered by anisotropic etching with high precision, that is, the cross-shaped convexity becomes narrower toward its protruding end (toward the principal plane or the top surface of the wafer). An optical semiconductor element 3 is mounted on one side of the optical element carrier 1 (on the thick portion of the wafer).

A single crystal silicon platform 4 has formed in its top surface by anisotropic etching cross-shaped V-groove 5 and a smaller V-groove 6 in alignment with the horizontal V-groove. The V-grooves 5 and 6 are separated by a square-sectioned groove 7 that extends at right angles to but communicate with them. Incidentally, such platforms are also simultaneously produced in quantities using a single crystal silicon wafer in the same manner as in the case of the optical element carrier 1. The optical element carrier 1 is mounted on the platform 4 with the cross-shaped convexity 2 of the former fitted in the cross-shaped V-groove 5 of the latter, and an optical fiber 8 is positioned in the V-groove 6. The cross-shaped convexity 2 and the cross-shaped V-groove 5 are high in dimensional accuracy, and through utilization of their mechanical accuracy, the optical element carrier 1 can be mounted on the platform 4 with high accuracy. This ensures satisfactory optical coupling between the optical semiconductor element 3 mounted on the carrier 1 and the core of the optical fiber 8 disposed in the V-groove 6.

According to the method of document 1, however, the optical element is fixedly mounted to the V-grooved substrate as by flip chip bonding while visually identifying a marker attached to the substrate. In the method of document 2, too, the optical element 3 is similarly mounted on the optical element carrier 1. Accordingly, the positioning accuracy is dependent on the accuracy of bonding and lower than in the case of engagement between a V-groove and concave-convex structures (convexity and groove) formed by anisotropic etching.

On the other band, a solution to this problem is set forth, for example, in Japanese Patent Application Kokai Publication Gazette No. 313756/96 (published Nov. 29, 1996, hereinafter referred to as document 3). According to the proposed method, a V-groove is cut in one surface area of a single crystal silicon and an optical waveguide is formed in alignment with the V-groove by coating a film directly on the non-grooved surface area of the substrate, thereby achieving positioning with accuracy of microfabrication.

It is difficult to mount such a microminiature optical element as the photonic crystal element by the methods set forth in documents 1 and 2, and even if it could be mounted, it gives rise to the above-mentioned problem that the positioning accuracy depends on the bonding accuracy. In the case of forming such a microminiature optical element as the photonic crystal element directly on the V-grooved substrate, the microminiature optical element takes up so small an amount of the V-grooved substrate surface that the manufacturing costs inevitably rise. In other words, since this method cannot utilize the technique of simultaneously forming a large number of microminiature optical elements on a substrate or wafer and severing them into individual elements, it is impossible to reduce the manufacturing costs through mass-production, failing to take advantage of microminiature optical elements.

SUMMARY OF THE INVENTION

It is therefore an object of the present invention to provide an optical element assembly which allows easy and high-precision positioning between an optical part and a microminiature optical element having light entering and emitting end faces (light inlet and outlet ports) of a size as small as 10 μm or less and which permits mass-production of such microminiature optical elements.

Another object of the present invention is to provide a method of making the above-mentioned optical element assembly In the optical element assembly according to the present invention, an optical element chip, which has a convexity or concavity formed in one side of a chip body and an optical element formed on the protruding end face of the convexity or the bottom of the concavity, is mounted in an element mounting portion of a platform by fitting therein the convexity or concavity of the optical element chip. This fitting ensures proper positioning of the optical element with respect to an optical element chip mounting surface (hereinafter referred to as a mounting surface) of the platform. In the mounting surface of the platform there is formed a part receiving concavity in to closely receive an optical part in proper positional relation for optical coupling to the optical element.

According to the manufacturing method of the present invention, convexities or concavities are formed in rows and columns by lithography and etching in one surface of a wafer to a predetermined height or depth from the wafer surface, then an optical element is formed on the protruding end face of each convexity or on the bottom of each concavity, and the wafer is severed into individual optical element chips. In the mounting surface of the platform on which an optical part is to be mounted, an element mounting portion and a part receiving recess for receiving the optical element positioned therein are formed by lithography and etching, and the optical element is mounted on the platform by engaging its convexity or concavity with the element mounting portion.

Since the optical element assembly of the present invention has the above-mentioned configuration in which the optical element is positioned on the mounting surface of the platform and the optical element is automatically positioned by the part receiving concavity with respect to the mounting surface, optical coupling between the optical part and the optical element is established with high accuracy. That is, since the optical element is formed on the protruding end face of the convexity or on the bottom of the concavity of the optical element chip, it is possible to adopt techniques of simultaneously forming a large number of convexities or concavities in a wafer, then simultaneously forming optical elements on protruding end faces of the convexities or on the bottoms of the concavities and severing the wafer into optical element chips; thus, it is possible to mass-produce optical element chips of the same shape and dimensions with high accuracy, and the optical element chip can be positioned on the platform with high accuracy by engagement of its convexity or concavity with the element mounting portion. Accordingly, when the optical part is mounted in the part receiving recess, its optical coupling to the optical element can be achieved with high accuracy. In addition, the optical element can be fabricated at low cost.

DETAILED DESCRIPTION OF THE PREFERRED EMBODIMENTS

A description will be given first of an embodiment that uses an optical element chip provided with a protrusion or convexity.

Embodiment 1

Figure 1:
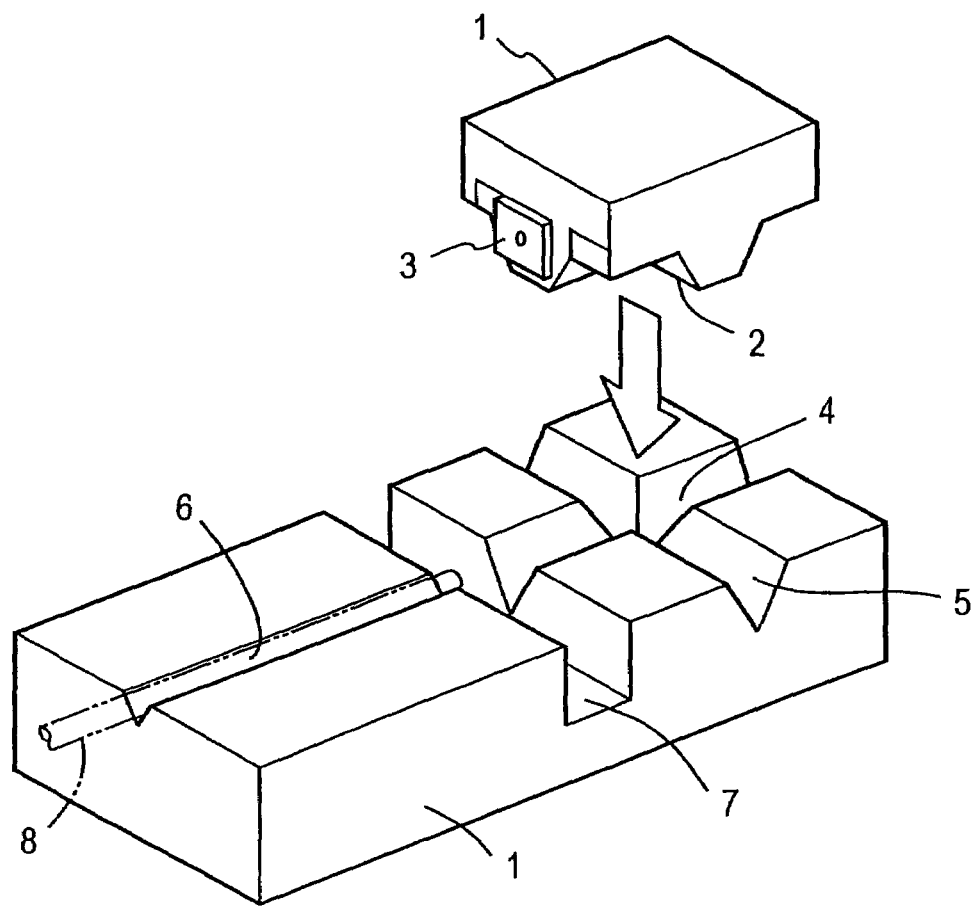
FIG. 1 is an exploded perspective view showing a conventional optical element assembly.
Figure 2:
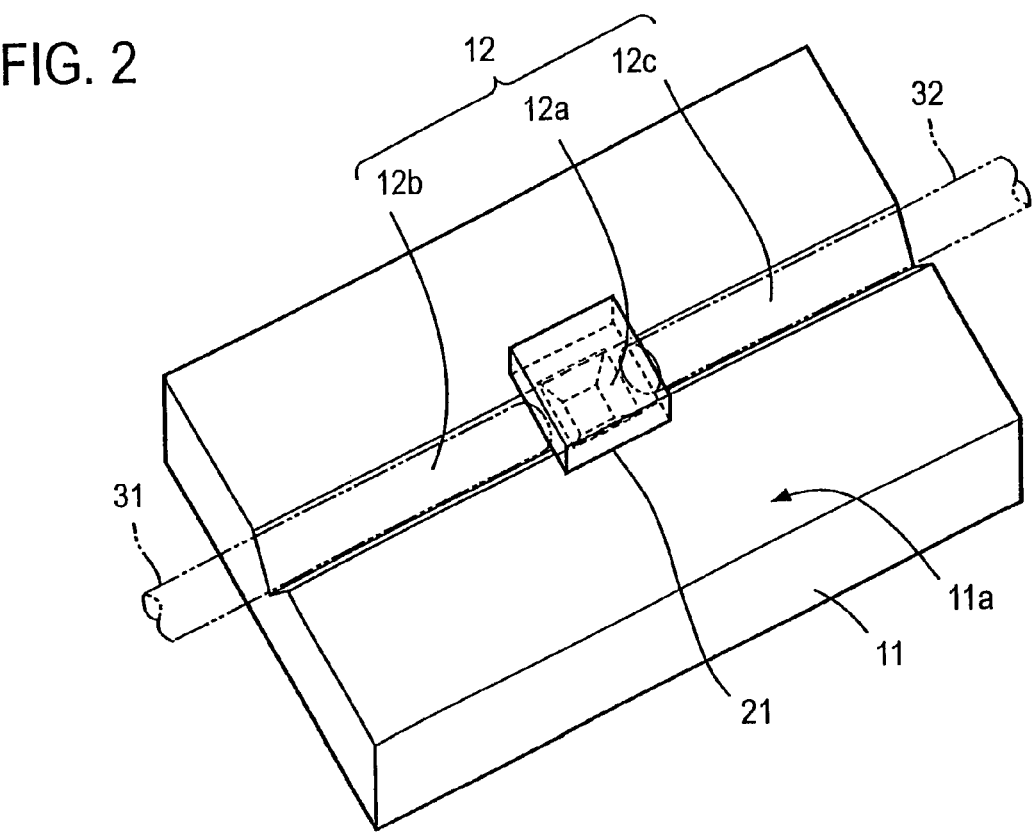
FIG. 2 is a perspective view illustrating an embodiment of the present invention which is provided with an optical element chip having a convexity.

This embodiment uses, as an optical element, a wavelength filter formed of a photonic crystal. As depicted in FIG. 2, an optical element chip 21 is positioned with respect to the mounting surface 11a and mounted on an element mounting portion 12a formed in one surface, i.e. in amounting surface of a platform 11. The optical element chip 21 may be adhesively bonded to the platform 11. In this embodiment the platform 11 has in its mounting surface 11a a V-groove 12 extending from the one to the other end thereof, and the intermediate portion of the V-groove 12 is used as the element mounting portion 12a. The V-groove portions 12 at both sides of the element mounting portion 12a form part receiving recesses 12b and 12c; in this example, optical fibers 31 and 32 as optical parts are inserted in the part receiving recesses 12b and 12c, then positioned with respect to the mounting surface 11a, and fixed to the platform 11. The optical fibers 31 and 32 are, for example, adhesively bonded to the platform 11, but this bonding may be done by individual users.

Figure 3:
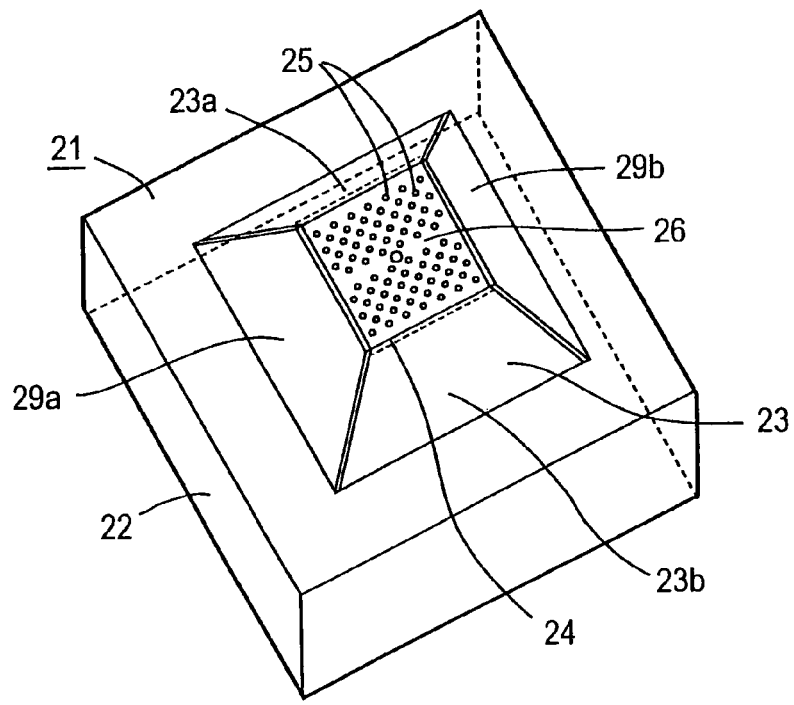
FIG. 3 is an enlarged perspective view of the optical element chip in FIG. 2.

As shown in FIG. 3, the optical element chip 21 in this embodiment is composed of a square plate-like chip body 22, a convexity 23 protrusively provided on one side of the chip body 22, and an optical element 24 formed on the end face of the convexity 23. In this embodiment the optical element 24 is a wavelength filter constructed from the photonic crystal. That is, a high refractive index material layer is patterned with a two-dimensionally periodic arrays of holes 25, within which a line defect of missing holes is defined, where one hole of a different diameter is made to form a wavelength selective optical waveguide 26 that transmits therethrough light of a particular wavelength. In this embodiment the convexity 23 has the outside shape of a frustum of pyramid, that is, the bottom and protruding end face of the convexity 23 are similar squares, and four side surfaces of the convexity 23 are sloped.

Figure 4:
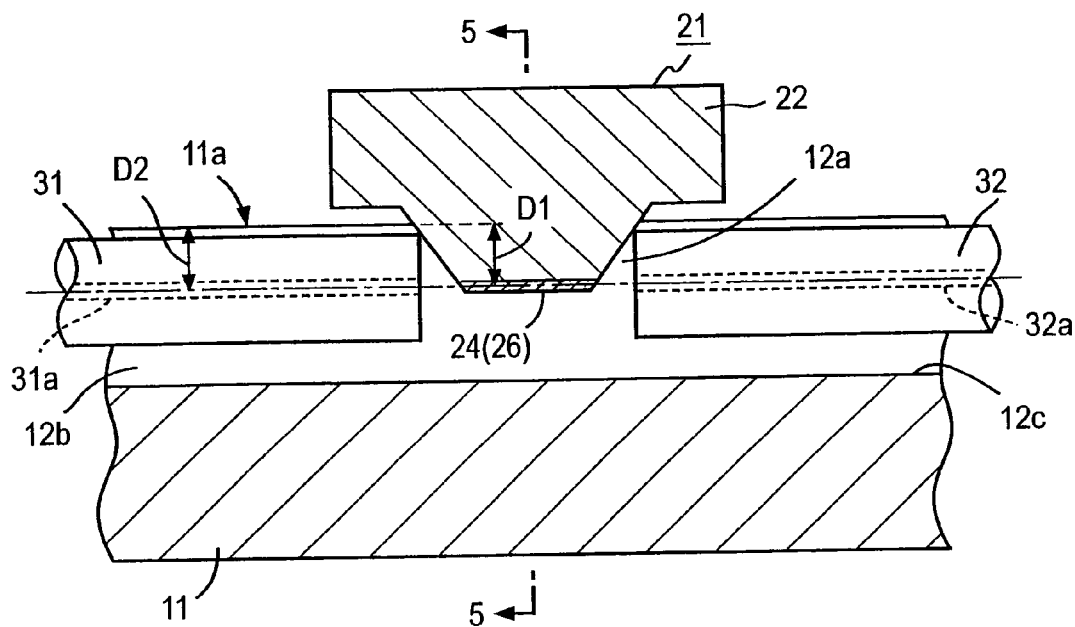
FIG. 4 is an enlarged sectional view of one portion of the FIG. 2 embodiment, taken along the line 4-4 in FIG. 5.
Figure 5:
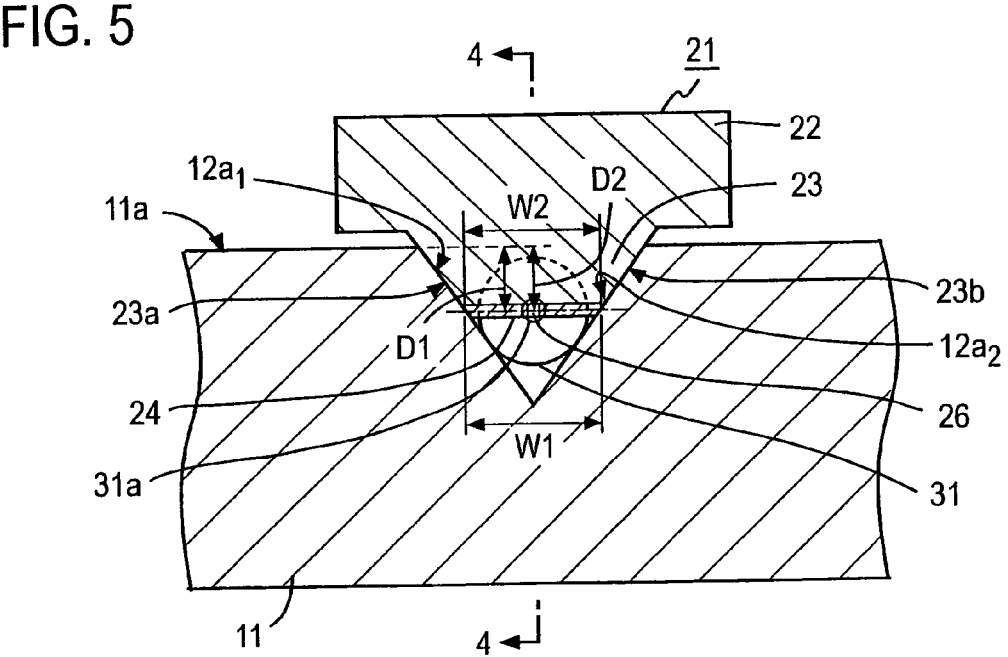
FIG. 5 is a sectional view taken along the line 5-5 in FIG. 4.

As depicted in FIGS. 4 and 5, the optical element chip 21 is mounted on the platform 11 with the convexity 23 of the former fitted in the element mounting portion 12a of the latter to position the optical element 24 wit respect to the mounting surface 11a. In FIGS. 4 and 5 the thickness of the platform 11 under the V-groove 12 is shown scaled-down. This applies to the corresponding drawings mentioned hereinafter.

The angle between both wall surfaces $12a_1$ and $12a_2$ of the V-groove of the element mounting portion 12a is equal to the angle between a pair of opposed side surfaces 23a and 23b of the convexity 23. Accordingly, when the spacing between the wall surfaces $12a_1$ and $12a_2$ coincides with the spacing between marginal edges of the side surfaces 23a and 23b at both sides of the optical element 24, the wall surfaces $12a_1$, $12a_2$ and the side surfaces 23a, 23b make surface-to-surface contact with each other as shown in FIG. 5 and the convexity 23 inserted in the element mounting portion 12a is fixedly engaged therewith. With the convexity 23 fitted in the element mounting portion 12a, the depth D1 of the optical element 24 from the mounting surface 11a, that is, the position of the optical element 24 with respect to the mounting surface 11a in a direction perpendicular thereto is determined. The position of the optical element 24 in a plane parallel to the mounting surface 11a in a direction perpendicular to the direction of extension of the V-groove 12 is determined so that the center line between the side surfaces 23a and 23b of the optical element 24 lies midway between the wall surfaces $12a_1$ and $12a_2$ of the element mounting portion 12a.

The optical element 24 is held in parallel to the mounting surface 11a. That is, by fitting the convexity 23 in the element mounting portion 12a, the optical element 24 is automatically positioned with respect to the mounting surface 11a.

When the optical fibers 31 and 32 are inserted in the part receiving recesses 12b and 12b, cores 31a and 32a of the optical fibers 31 and 32 are located midway between both wall surfaces of the parts receiving grooves 12b and 12c, and their depth D2 (distance from the mounting surface 11a is also determined. That is, when inserted and mounted in the part receiving recesses 12b and 12c, the optical fibers 31 and 32 are automatically positioned with respect to the mounting surface 11a.

Since the diameters of the optical fibers 31 and 32, which are commercially available, are known, and since the side surfaces 23a and 23b of the convexity 23 are sloped in conformity to the inclined wall surfaces of the V-groove 12 so that when the optical fibers 31 and 32 are mounted in the part receiving recesses 12b and 12c, the width W1 of each of the part receiving recesses 12b and 12c at the depth D2 of the optical fiber cores 31a and 32a from the mounting surface 11a coincides with the width W2 of the protruding end face of the convexity 23 to place the fiber cores 31a and 32a in alignment with the optical element 23, automatically establishing optical coupling between the optical element 23 and the optical fibers 31 and 32 with high accuracy.

According to this embodiment, when the optical element chip 21 is mounted on the platform 11 by fitting the convexity 23 of the former into the element mounting portion 12a of the latter, the position of the optical element 24 in the direction perpendicular to the mounting surface 11a and in one direction parallel thereto is determined to hold the optical element 24 in parallel to the mounting surface 11a, and when the optical fibers 31 and 32 are mounted in the part receiving recesses 13b and 13c, they are each located at the same position as that of the optical element 24 in the above-mentioned direction perpendicular to the mounting surface 11a and in the said one direction parallel thereto, and consequently the optical fibers 31 and 32 optically couple to the optical element 24 with high accuracy.

With the structure of this embodiment, light propagated through the optical fiber 31 enters the photonic crystal optical element 24, and only an optical component of a wavelength determined by the constitution of the optical element 24 is transmitted therethrough and launched into the optical fiber 32 for propagation therethrough.

Embodiment of Manufacturing Method

A description will be given of an embodiment of a method for making the optical element assembly of Embodiment 1 described above.

Figure 6A:
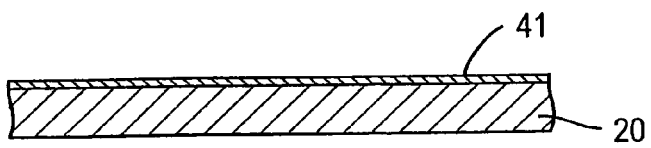
FIG. 6A is a sectional view of part of a wafer covered with a resist film.
Figure 6B:
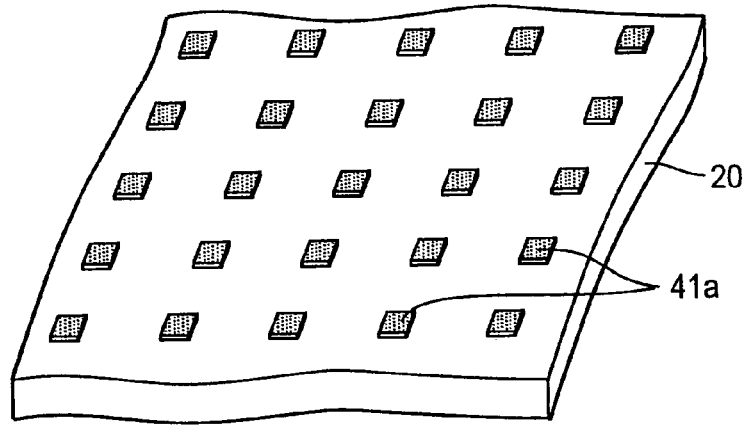
FIG. 6B is a perspective view showing, by way of example, patterning of the resist film on the wafer.

As depicted in FIG. 6A, a single crystal silicon wafer 20, for instance, is coated over the entire area of its crystal plane (100) with a resist layer 41, which is subjected to patterning by ultraviolet ray or electron beam lithography and developed. At this time, patterning for forming the convexities 23 and patterning for forming air holes 25 and wavelength selective optical waveguides 26 of photonic crystal elements in this example are conducted at the same time. That is, as shown in FIG. 6B, many square resists 41a are left unremoved in rows and columns, and each resist 41a has many air holes 25 and one air hole of a different diameter as depicted in FIG. 3. In FIG. 6B, the air holes are all shown as dots for the sake of convenience.

Figure 6C:
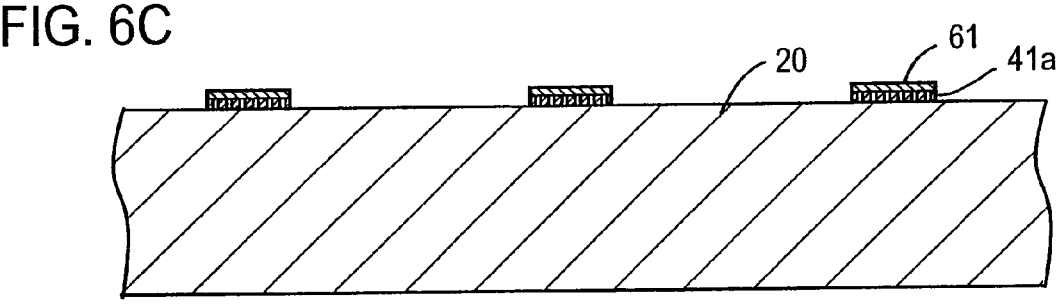
FIG. 6C is an enlarged sectional view of part of the wafer having each square resist 41a coated with a protective film 61.

A protective film is formed all over the wafer surface including the square resists 41a, and the film is patterned by photolithography to form a protective film 61 over each square resist 41a as shown in FIG. 6C.

Figure 6D:
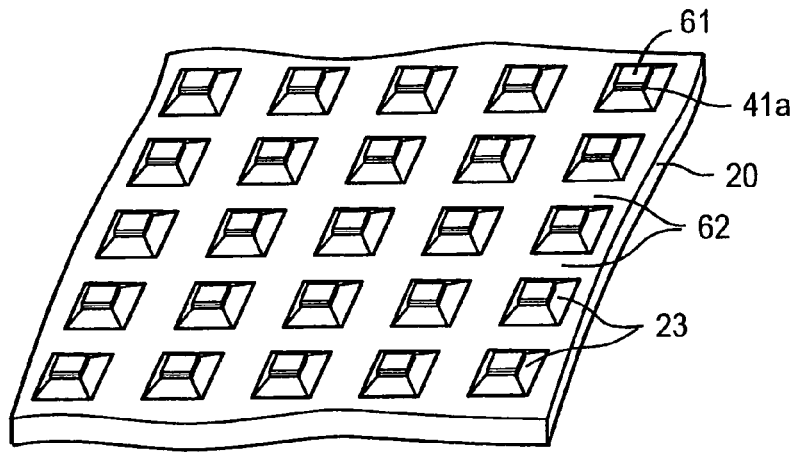
FIG. 6D is a perspective view showing part of the wafer having formed thereon convexities.
Figure 6E:
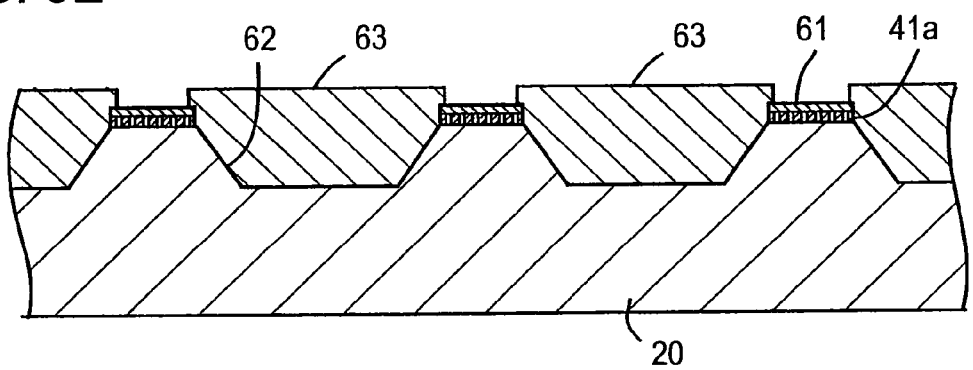
FIG. 6E is an enlarged sectional view of part of the wafer with a groove protecting resist layer formed thereon by patterning.
Figure 6F:
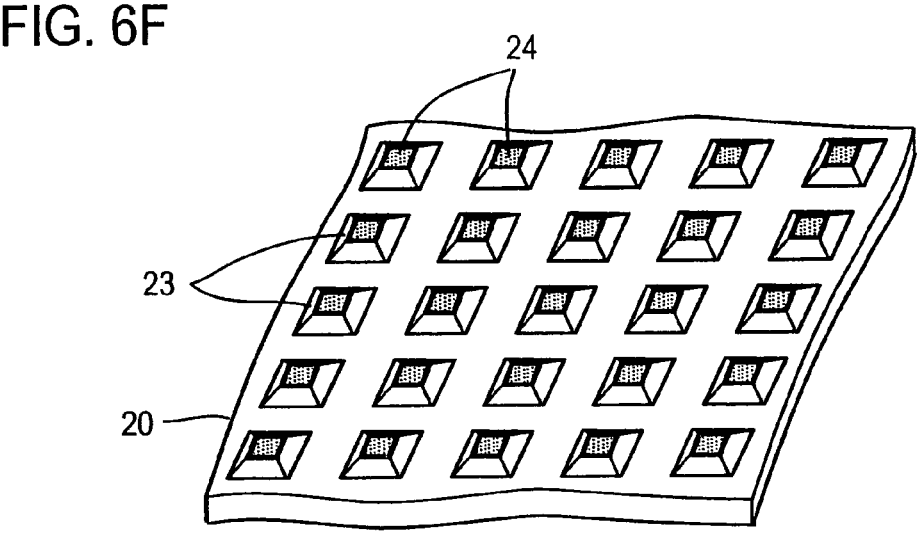
FIG. 6F is a perspective view showing part of the wafer having an optical element formed on each convexity.

Next, the wafer 20 is subjected to etching by KOH liquid, using the protective films 61 and the square resists 41a as etching masks. Due to anisotropy by the crystal orientation of single crystal silicon, grooves 62 are formed to define frustum-shaped convexities 23 in rows and columns as depicted in FIG. 6D. After removal of the protective film 61 resist is coated all over top surface of the wafer 20 and patterned by photolithography to form resist portions 63 protecting the grooves 62 and expose the square resists 41a on the protruding end faces of the convexities where patterns of photonic crystal are formed.

The photonic crystal optical elements 24 are formed on the top faces of the convexities 23 by inductive coupling plasma etching or similar dry etching through the square resists 41a. This is followed by the removal of the square resists 41a and the protective resist portions 63 to provide a structure that has the photonic crystal optical element (wavelength selective waveguide element) 24 formed directly on the top of each convexity 23. The relative positioning of the mask and the wafer for patterning the protective films 61 and the protective resist portions 63 is carried out using markers positioned at the same time as the convexities 23 and the photonic crystal optical elements were subjected to patterning, for instance.

The machining of photonic crystal is not limited specifically to the above-mentioned lithography but femto-second laser machining can also be used. In this instance, positioned markers are formed together with the convexities 23 through utilization of photolithography masks for the convexities 23, then the marker areas are subjected to etching to form through holes in th wafer, the light intensity of the femto-second laser passing through the trough holes is monitored to detect the position of the laser beam with respect to the wafer 20, and laser machining is performed accordingly.

The wafer 20 having photonic crystal optical elements 24 formed on the top surfaces of the respective convexities 23 is diced into plural optical elements chips 21 such as shown in FIG. 5.

The platform 11 is also mass-produced by forming many V-grooves 12 in parallel, for example, in a single crystal silicon wafer by anisotropic etching and dicing the wafer into individual platforms 11 as depicted in FIG. 2.

As described above, the width of a resist mask for forming each V-groove 12 can be used to accurately define the depth D2 from the mounting surface 11a where the cores 31a and 32a of the optical fibers 31 and 32 are located. Further, the spacing W1 between the opposed wall surfaces of the V-groove 12 at the depth D2 is also defined. The width of the resist mask, which determines the formation of the side surfaces 23a and 23b during the formation of the convexity 23 is chosen equal to the width W2 of the protruding end face of the convexity 23 between the marginal edges of the side surfaces 23a and 23b; this can also be determined with high accuracy. As the result of this, the angle between the both wall surfaces of the V-groove 12 and the angle formed by the side surfaces 232a and 23b of the convexity 23 becomes equal.

Since the reference for determining the spacing W2 between marginal edges of the side surfaces 23a and 23b of the convexity 23, which determines the position where to mount the optical element 24 on the element mounting portion 12a, that is, position the optical element 24 with respect to the mounting surface 11a, and the reference for determining the position of the optical element 24 with respect to the optical element chip 21, in this example, the positions of the light inlet and outlet ports of the wavelength selective optical waveguide of the optical element 24, in particular, are the same as the reference point of the mask that is used for lithography for fabricating the optical element chip 21, the optical element 24 is positioned with respect to the platform 11 with high accuracy when the optical element chip 21 is mounted on the platform 11. The positions and shapes of the element mounting portion 12a and the part receiving recesses 12b and 12c in the platform 11 with respect to the mounting surface 11a are also highly accurate because they are formed with reference to the same mask during the formation by the lithography. Accordingly, the light inlet and outlet ports of the wavelength selective optical waveguide, which is the optical element 24 in this example, are aligned with the cores 31a and 32a of the optical fibers 31 and 32 with high accuracy, establishing optical coupling between the optical element 24 and the optical fiber cores 31a and 32a with a very high degree of accuracy.

By anisotropic etching of the single crystal silicon wafer as referred to previously, it is possible to form the side surfaces that are flat at the atomic phase level and high in dimensional accuracy. Accordingly, positioning for optical coupling between the light inlet and outlet ports of the optical element 24 and the cores 31a and 32a of the optical fibers 31 and 32 can be achieved with high accuracy on the order of 1 µm or less; hence, the optical fiber cores 31a and 32a can be positioned with respect to a slab type photonic crystal optical waveguide even if its light inlet and output ports are on the order of 1 µm or less in size (thickness). In addition, the optical element chip 21 can be mass-produced, and each optical element chip 21 can easily be mounted on the platform 11 by fitting the former into the latter.

In the case where the optical element 24 is a two-dimensional photonic crystal optical element having a high refractive index material layer perforated with the air holes 25 as depicted in FIG. 3, incidence and emittance of light take place between air of a low refractive index and the optical element 24 of a high refractive index, and hence there is a fear of causing a serious reflection loss. This can be avoided by forming antireflective films on the light inlet and outlet ports of the photonic crystal optical element 24. In FIG. 3, antireflective films 29a and 29b are formed on side surfaces of the convexity 23 perpendicular to the wavelength selective optical waveguide 26. The antireflective films 29a and 29b may be formed, for example, simultaneously with each convexity 23 prior to severing the wafer 20 after the formation of the convexities 23 in the course of manufacturing the optical element chips described above with reference to FIG. 6.

Embodiment 2

Figure 7:
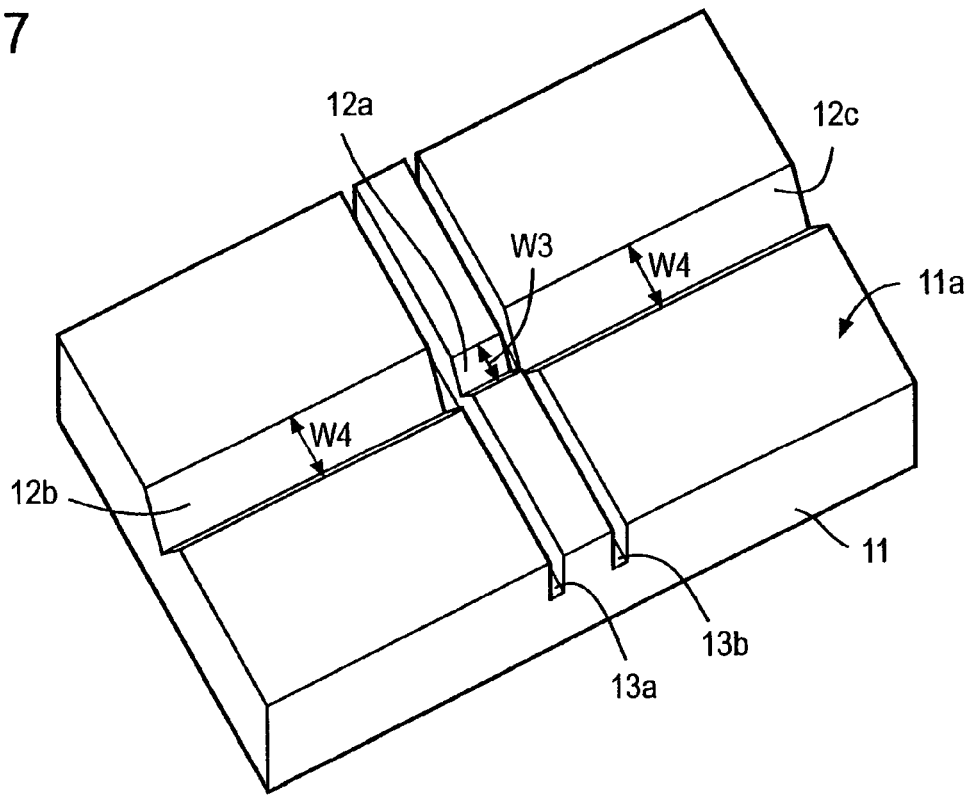
FIG. 7 is a perspective view illustrating another example of th platform.

This embodiment is intended to increase the number of optical element chips 21 obtainable from one wafer 20 (FIG. 6) by making the width of the V-grove of the element mounting portion 12a narrower than the part receiving recesses 12b and 12c and reducing the length of protrusion of the convexity 23. FIG. 7 shows an example of the platform 11 in this embodiment. The element mounting portion 12a and the part receiving recesses 12b and 12c formed by V-grooves are axially aligned with each other, looking in the direction perpendicular to the mounting surface 11a, but the groove width W3 of the element mounting portion 12a is smaller than the groove width W4 of each of the part receiving recesses 12b and 12c. In the case of forming theses V-grooves by anisotropic etching, since both ends of the element mounting portion 12a protrude obliquely downwardly into the recesses 12b and 12c, the optical fibers 31 and 32 cannot be disposed close to the optical element 24 accordingly. In this example, narrow grooves 13a and 13b are cut in the platform 11 at right angles to each V-groove at the boundaries between the element mounting portion 12a and the part receiving recesses 13a, 13b, making respective faces of the recesses 12b and 12c perpendicular to the mounting surface 11a.

Figure 8:
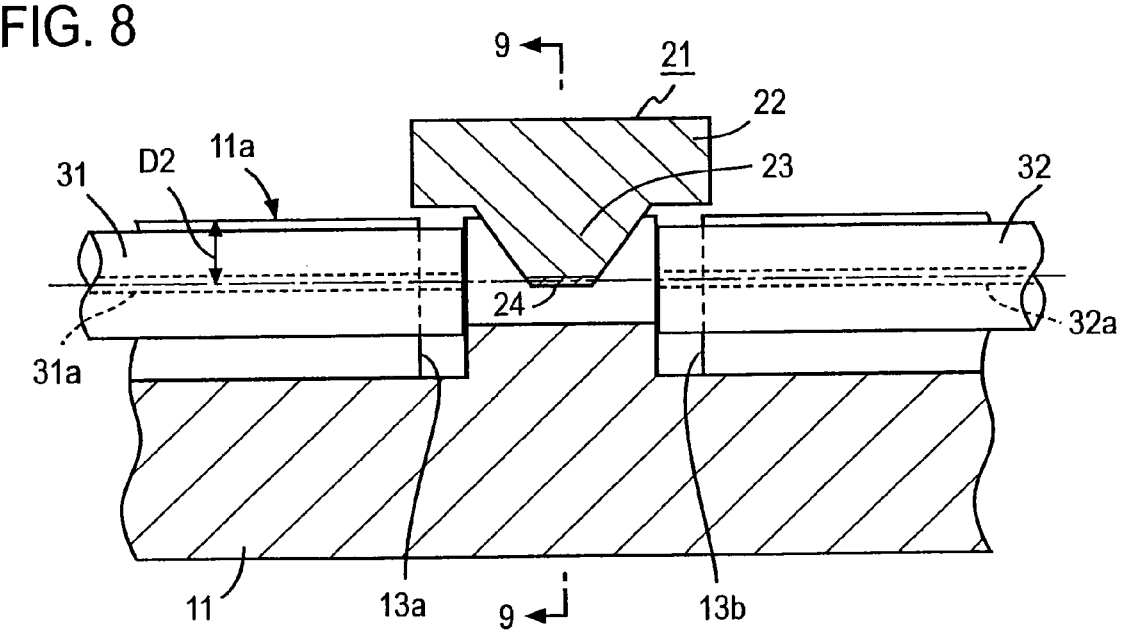
FIG. 8 is an enlarged perspective view of part of an embodiment using the FIG. 7 platform, taken along the line 8-8 in FIG. 9.
Figure 9:
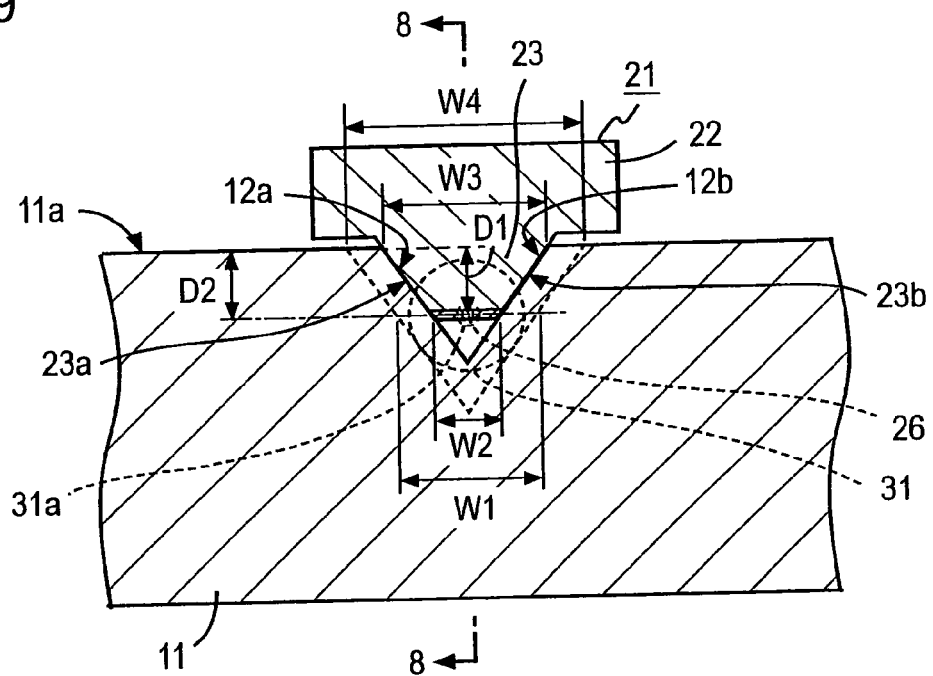
FIG. 9 is a sectional view taken along the line 9-9 in FIG. 8.

FIGS. 8 and 9 are sectional views of this embodiment respectively corresponding to FIGS. 4 and 5. As can be seen from FIG. 9, the distance D1 from the optical element 24 to the mounting surface 11a is equal to the distance D2 from the optical fiber cores 31a and 32a to the mounting surface 11a, but the spacing W2 between the marginal edges of the side surfaces 23a and 23b, which determines the depth of insertion of the convexity 23 into the element mounting portion 12a, is determined by the narrow groove of the element mounting portion 12a, and the depth of insertion D1 of the convexity 23 is the same as in Embodiment 1, but the spacing W2 is narrower than in the case of Embodiment 1.

Accordingly, the area of the protruding end face of the convexity 23 can be made smaller than in the case of Embodiment 1.

Embodiment 3

Figure 10:
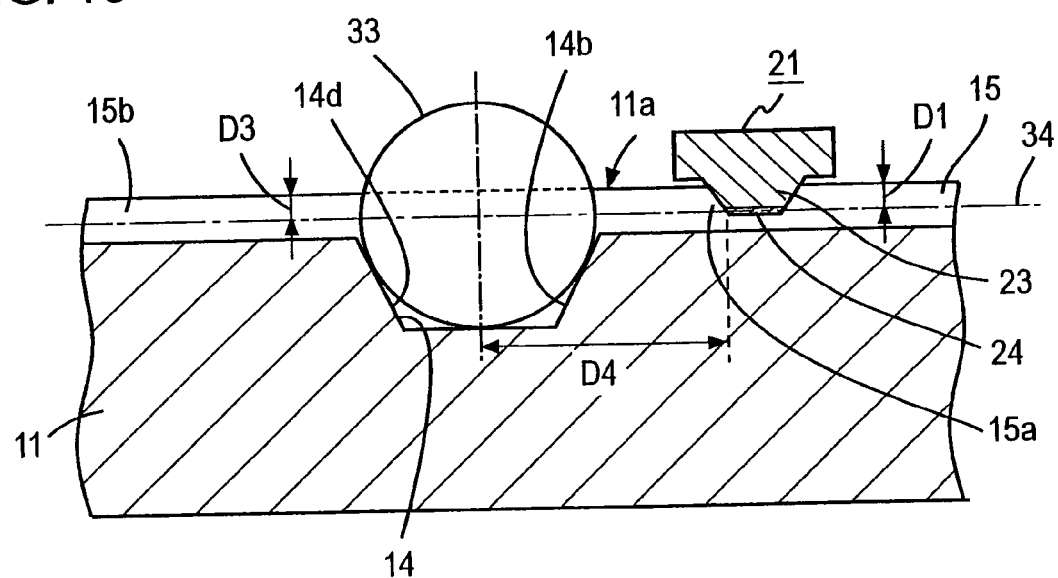
FIG. 10 is an enlarged sectional view illustrating an embodiment using an ultraminiature lens as an optical part.
Figure 11:
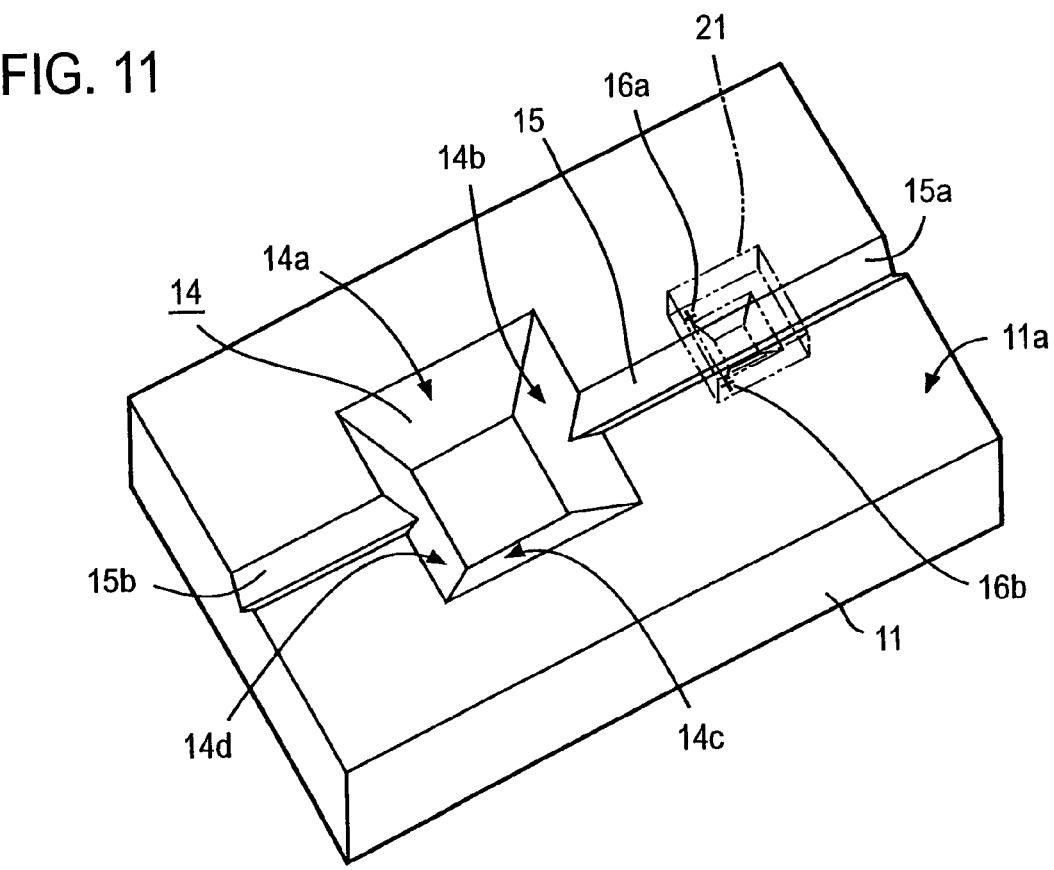
FIG. 11 is a perspective view of a platform used in Fig. the 10 embodiment.

This embodiment uses a microminiature lens as an optical part. FIG. 10 shows in section the structure of this embodiment, corresponding to the FIG. 4 sectional view of Embodiment 1, and FIG. 11 depicts an example of the platform 11 for use in this embodiment. In the mounting surface 11a of the platform 11 there are formed a square part receiving concavity 14 and a V-groove 15 extending at right angles to one side thereof and opening into the concavity 14. One part 15a of the V-groove 15 is used as the element mounting portion. In this example, the V-groove 15 is formed as its extension 15b in the platform surface also on the side thereof opposite the element mounting portion 15a; that is, the V-groove 15 opens at both ends to the outside of the platform 11. The part receiving concavity 14 and the V-groove 15 can be formed simultaneously by, for example, anisotropic etching.

As shown in FIG. 10, a microminiature spherical lens 33 is disposed in and positioned by the part receiving concavity 14, by which the optical axis 34 of the spherical lens 33 is positioned with respect to the mounting surface 11a. That is, four wall faces 14a to 14d of the part receiving concavity 14 contact the spherical lens 33 to arrest its further downward insertion into the concavity 14, by which the distance D3 of the optical axis 34 from the mounting surface 11a, that is, the position of the optical axis 34 in the direction perpendicular to the mounting surface 11a is determined and, at the same time, the position of th optical axis 34 in the plane perpendicular to the mounting surface 11a and containing the center line between the wall surfaces 14a and 14c is determined. In this way, the spherical lens 33 is automatically positioned by the part receiving concavity 14 with respect to the mounting surface 11a. The spherical lens 33 is fixed to the platform by use of an adhesive, for instance.

The optical element chip 21 has the same construction as, for example, in Embodiment 1. Accordingly, when the optical element chip 21 is mounted with its convexity 23 fitted in the element mounting portion 15a of the V-groove 15, the pair of opposed side surfaces (corresponding to those 23a and 23b in Embodiment 1) of the optical element chip 21 make surface-to-surface contact with both wall surfaces of the V-groove 15, and the insertion depth D1 of the convexity 23 is determined by the spacing (corresponding to W2 in Embodiment 1) between the marginal edges of the above-mentioned opposed side surfaces of the optical element 24, by which the optical element 24 is positioned with respect to the mounting surface 11a as is the case with Embodiment 1. Accordingly, the optical element 24 is positioned with respect to the mounting surface 11a by the same scheme as in Embodiment 1 so that the depth D1 of the optical element 24 and the depth D3 of the optical axis are equal to each other and that a plane containing the center axis between the wall surfaces 14a and 14c of the concavity 14 and a plane just midway between both wall surfaces of the V-groove 15 coincide in a plane perpendicular to the mounting surface 11a. This can easily be accomplished by forming the concavity 14 and the V-groove 15 in the platform 11, for example, by anisotropic etching.

The focal point of the spherical lens 33 may preferably be in alignment with the light inlet/outlet port of the optical element 24 facing the lens 33. As shown in FIG. 11, at least two markers 16a and 16b are symmetrically formed at both sides of the V-groove 15 on the mounting surface 11a in the vicinity of the element mounting portion 15a so that the light inlet/outlet port of the optical element 24 is located at a position spaced the focal length D4 of the spherical lens 33 away from a plane just midway between the wall surfaces 14b and 14d of the part receiving concavity 14. The markers 16a and 16b may be formed as metal films by photolithography simultaneously with the formation of the part receiving concavity 14 and the V-groove 15. To mount the optical element chip 21 on the mounting portion 15a with respect to the markers 16a and 16b, the convexity 23 needs only to be fitted in the element mounting portion 15a with both corners of the chip body 22 on the side of the convexity 23 positioned with respect to the markers 16a and 16b, for example, under a microscope in the same manner as in the case of using flip chip bonding techniques. The optical element chip 21 and the platform 11 are fixed, for example, by an adhesive.

In this optical element assembly, the optical axis 34 of the spherical lens 33 is held in parallel to the optical element 24, and the focal point of the spherical lens 33 lies on the light inlet/outlet port of the optical element 24 facing the lens 33. This ensures accurate optical coupling between the spherical lens 33 and the optical element 24. Light incident on the spherical lens 33 on the side opposite the optical element 24 is focused by the spherical lens 33 and launched into the optical element 24, and in this example only a particular wavelength component of the incident light passes through the optical element 24 that functions as a wavelength filter. It will easily be understood that this embodiment also produces that same operation/working effect as is obtainable with Embodiment 1.

Embodiment 4

Figure 12:
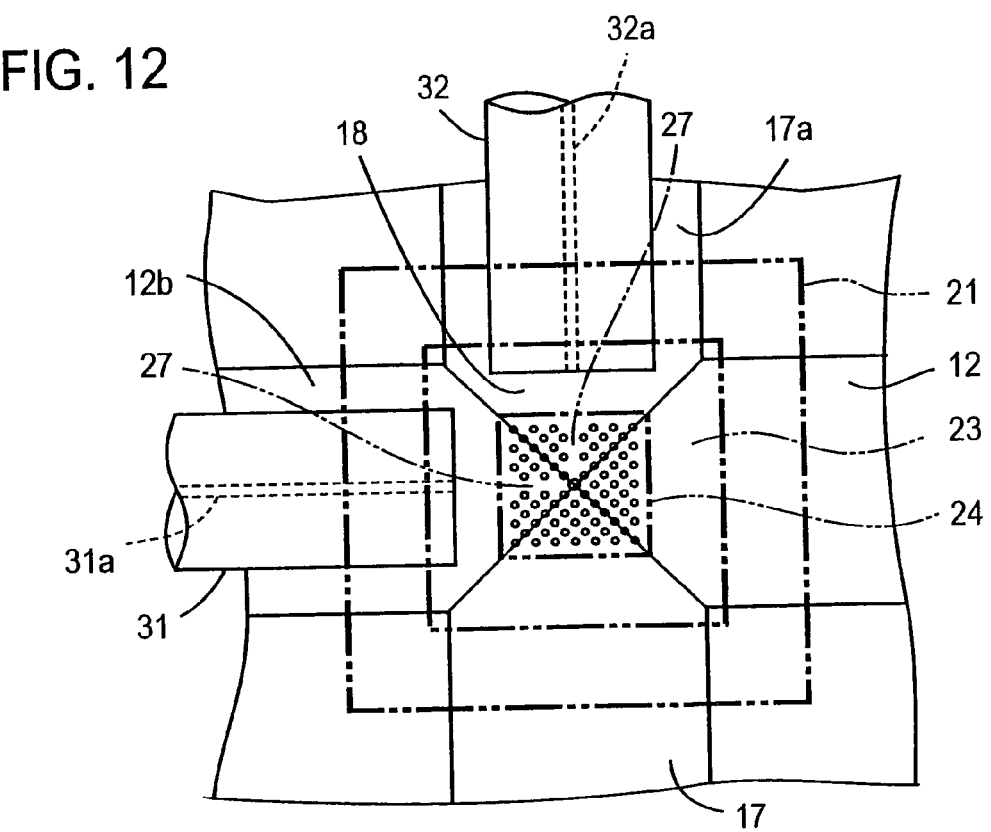
FIG. 12 is a plan view illustrating an embodiment using an optical element of an optical waveguide.

This embodiment uses, as the optical element 24, an element having an optical waveguide formed of the photonic crystal. FIG. 12 is a plan view of the principal part of such an optical element. In FIG. 12 the optical element chip 21 is shown as being inverted on the plane of the paper, that is, on the platform surface, as indicated by the chain double-dashed lines. In the mounting surface 11a of the platform 11 V-grooves 12 and 17 of the same shape and size are formed crosswise at right angles to each other, and their intersecting portion is used as an element mounting portion 18, by which the V-grooves 12 and 17 are each separated into two, each of which is used as a part receiving recess 12b (17b). That is, the part receiving recesses 12b and 17b extend at right angles to each other with the element mounting portion 18 located at the corner between them.

The optical element chip 24 is about the same as that used in Embodiment 1 but differs therefrom in that a 90° bend optical waveguide 27 is formed as the optical element 24. The optical element 24 is a photonic crystal slab of a high refractive index material which is perforated with two-dimensionally periodic arrays of air holes but has a 90° angle bending area with no air holes by which the optical waveguide 27 is defined.

The optical element 24 having such an optical waveguide 27 is positioned with respect to the mounting surface 11a in the same manner as described previously with reference to Embodiment 1. By the engagement of the pair of opposed side surfaces of the convexity 23 of the optical element chip 21 with both wall surfaces of the V-groove extending from the part receiving recess 12b of the element mounting portion 18, the position of the optical element 24 is determined in the direction of depth (in the vertical direction) from the mounting surface 11a and in the direction perpendicular to the direction of extension of the V-groove and parallel to the mounting surface 11a. With the engagement of the other pair of opposed side surfaces of the convexity 23 of the optical element chip 21 with both wall surfaces of the V-groove extending from the part receiving recess 17a of the element mounting portion 18, the position of the optical element 24 is determined in the direction of depth from the mounting surface 11a and in the direction perpendicular to the direction of extension of the V-groove 17 and parallel to the mounting surface 11a. In this instance, the above-mentioned two positions in the direction of depth from the mounting surface 11a are the same. That is, the protruding end face of the convexity 23 is square in plan configuration.

As in the case of Embodiment 1, one end portion of the optical fiber 31 is positioned and mounted in the part receiving recess 12b and one end portion of the optical fiber 32 is similarly positioned and mounted in the part receiving recess 17a. Accordingly, the cross-section of this embodiment perpendicular to the mounting surface 11a containing the optical fiber core 31a is substantially the same as the cross section in FIG. 4 except the optical fiber 32, the cross section perpendicular to the mounting surface 1a containing the optical fiber core 32a is substantially the same as the cross section in FIG. 4 except the optical fiber 31, and the cross section perpendicular to the optical fiber core 31a and the mounting surface 11a at the turn of the optical waveguide 27 is substantially the same as the cross section shown in FIG. 5. In this case, the optical waveguide 27 takes the place of the wavelength selective optical waveguide 26 in FIG. 5.

Because of such a configuration as described above, the optical element assembly of this embodiment has the same advantages as are obtainable with the Embodiment 1. That is, the optical waveguide 27 of the optical element 24 and the optical fiber core 31a are in accurate alignment with each other, and the optical waveguide 27 and the optical fiber core 32a are also in accurate alignment with each other—this ensures accurate optical coupling between the optical fiber cores 31a and 32a through the optical waveguide 27 of the optical element 24.

Embodiment 5

The optical element 24 is not limited specifically to the photonic crystal waveguide but may also be a vertical-cavity surface-emitting laser such as described below. The vertical-cavity surface-emitting laser is set forth, for example, in a Japanese journal, "Laser Kenkyuu," Vol. 29, No. 12(December 2001), pp. 773-778. The vertical-cavity surface-emitting laser has, in some cases, light inlet and outlet ports of a size of about 3 μm, and it is desirable that this laser and optical parts be positioned with respect to each other with high accuracy.

Figure 13:
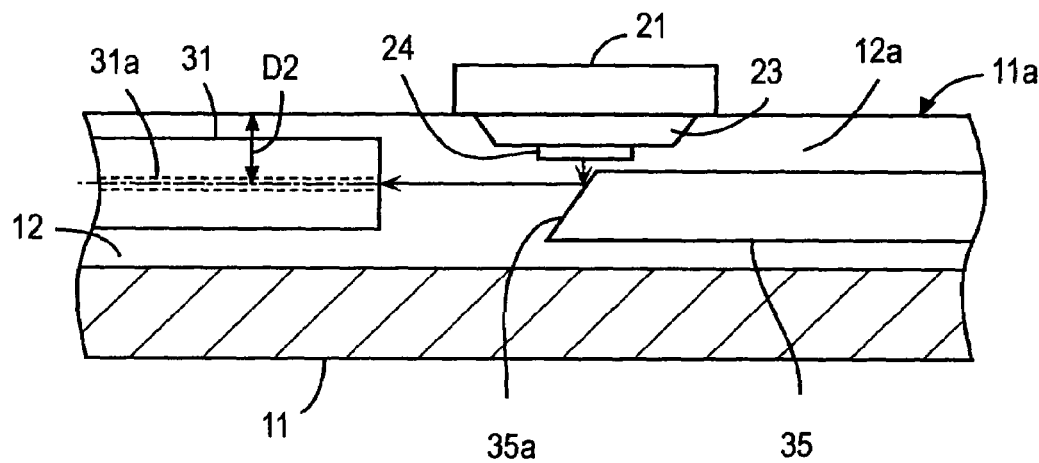
FIG. 13 is a sectional view of an embodiment using a surface emitting light emitting element as an optical element, taken along the line 13-13 in FIG. 14.
Figure 14:
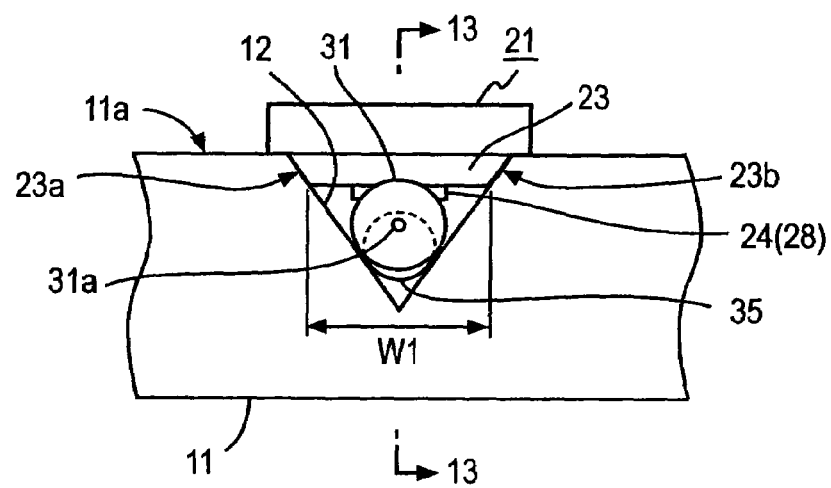
FIG. 14 is a left side view of the FIG. 13 embodiment.

FIGS. 13 and 14 illustrate the structure of this embodiment, FIG. 13 being a schematic diagram of the assembly structure partly in section along the line 13-13 in FIG. 14 and FIG. 14 being a left side view of the FIG. 13 structure. In the mounting surface 11a of the platform 11, as in the case of FIG. 2, there is formed the V-groove 12, one portion of which is used as the element mounting portion 12a, and the V-groove 12 at the left-hand side of the element mounting portion 12a in FIG. 13 is used as the part receiving recess 12b. The optical element chip 21 is about the same as that in Embodiment 1 but differs therefrom in that the vertical-cavity surface-emitting laser 28 is formed as the optical element 24 on the protruding end face of the convexity 23.

The optical element chip 21 is obtained by: forming the convexities 23 in quantities in row and columns, for example, on a single crystal GaAs wafer by means of photolithography and anisotropic etching in the same manner as described previously with respect to FIG. 6; then forming a compound semiconductor laser, as the vertical-cavity surface-emitting laser, on the protruding end face of each convexity 23 by patterning by photolithography, formation of a thin film by crystal growth and by selective removal of the thin film by etching; and cutting the wafer into individual optical element chips 21 each bearing the vertical-cavity surface-emitting laser 28.

The optical element chip 21 is mounted in place in the element mounting portion 12a by fitting the convexity 23 in the V-groove. That is, as in the case of Embodiment 1, the laser 28 is automatically positioned with respect to the mounting surface 11a at the depth that is determined by the width W1 of the protruding end face of the convexity 23 defined by the marginal edges of its side surfaces 223a and 23b. Though not shown in FIGS. 23 and 14, the optical element chip 21 is mounted on the mounting surface 11a at a predetermined position defined by the markers 16a and 16b (see FIG. 11) in the lengthwise direction of the V-groove 12 as described previously with reference to FIG. 11, for instance.

On end portion of the optical fiber 31 is positioned in the part receiving recess 12b in the same manner as in Embodiment 1. In the V-groove 12 opposite the part receiving recess 12b a mirror 35 is mounted on the platform 11. The mirror 35 is produced by cutting aslant one end of a cylinder as of metal, ceramics or glass and sufficiently accurate in diameter and coating a metal film all over the cut end face to form a mirror surface 35a. The mirror surface 35a is held opposite the light emitting surface of the vertical-cavity surface-emitting laser 28 and the core 31a of the optical fiber 31 so that light emitted from the vertical-cavity surface-emitting laser 28 is reflected by the mirror surface 3a for incidence on the core 31a.

That is, because of its cylindrical configuration, the mirror 35 is positioned by the V-groove 12 at the predetermined depth from the mounting surface 11a. In this case, the mirror 35 needs only to be positioned so that any area of the mirror surface lies at the depth D2 of the core 31a of the optical fiber 31; the diameter of the mirror 35 is chosen to meet such a requirement. The mirror 35 is positioned under visual observations to bring the mirror surface into opposing relation to the vertical-cavity surface-emitting laser 28, then the vertical-cavity surface-emitting laser 28 is caused to emit light, the intensity of light emitted from the optical fiber 31 is monitored, then the mirror 35 is turned about its axis to maximize the emitted light intensity, then fine adjustments are made to the distance between the mirror 35 and the optical fiber 31, and the mirror 35 is fixed to the platform 11 using an adhesive, for instance. The position of the mirror 35 can be adjusted relatively easily.

In this embodiment, the vertical-cavity surface-emitting laser 28 is formed on the protruding end face of the convexity 23, and the protruding end face and the convexity 23 are defined by an etching mask, that is, formed based on the same reference point, and the vertical-cavity surface-emitting laser 28 is positioned at the center of th protruding end face of the convexity 23 with high accuracy. Since the vertical-cavity surface-emitting laser 28 is positioned by the side surfaces 23a and 23b of he convexity 23 and the opposed wall surfaces of the V-groove 12, the laser 28 bisects the V-groove 12 and is located in the plane perpendicular to the mounting surface 11a with high accuracy.

Accordingly, the vertical-cavity surface-emitting laser 28 and the optical fiber 31 are optical coupled with high accuracy.

In Embodiments 1 through 4, the optical fiber may be replaced with a microminiature lens for optical coupling to the optical element 24 as in Embodiment 5.

Embodiment 6

In this embodiment, the optical element chip has an optical element formed on the bottom of a concavity formed in one side of the chip body. That is, in the present invention, the optical element chip has a convexity or concavity formed in one side of the chip body and an optical element formed on the protruding end face of the convexity or on the bottom of the concavity. A description will be given of an embodiment that uses the optical element chip having an optical element formed on the bottom of the concavity.

Figure 15:
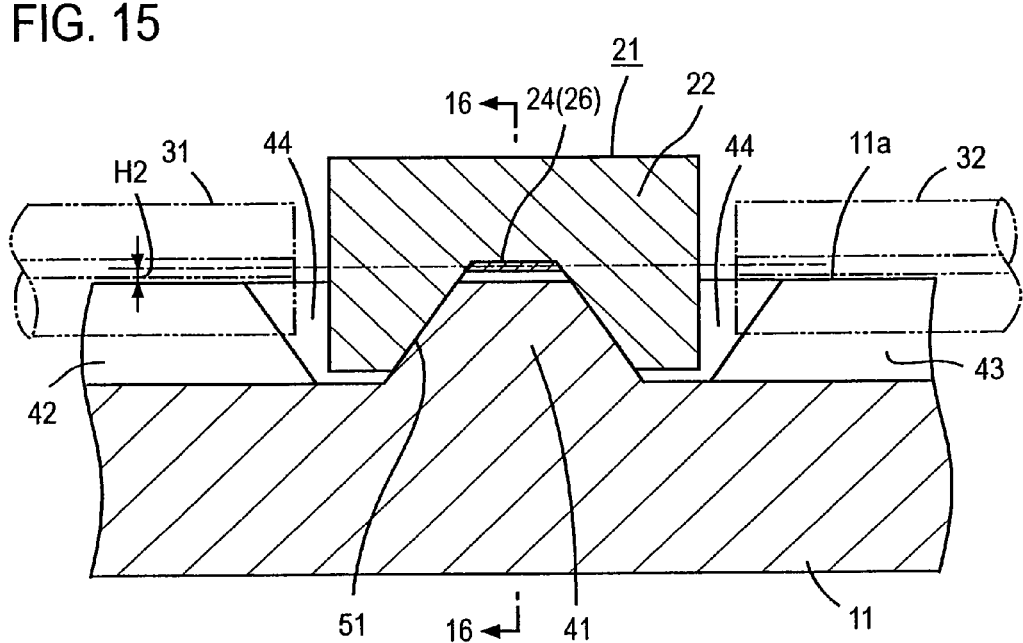
FIG. 15 is a sectional view of another embodiment using an optical element chip having a concavity, taken along the line 15-15 in FIG. 16.
Figure 16:
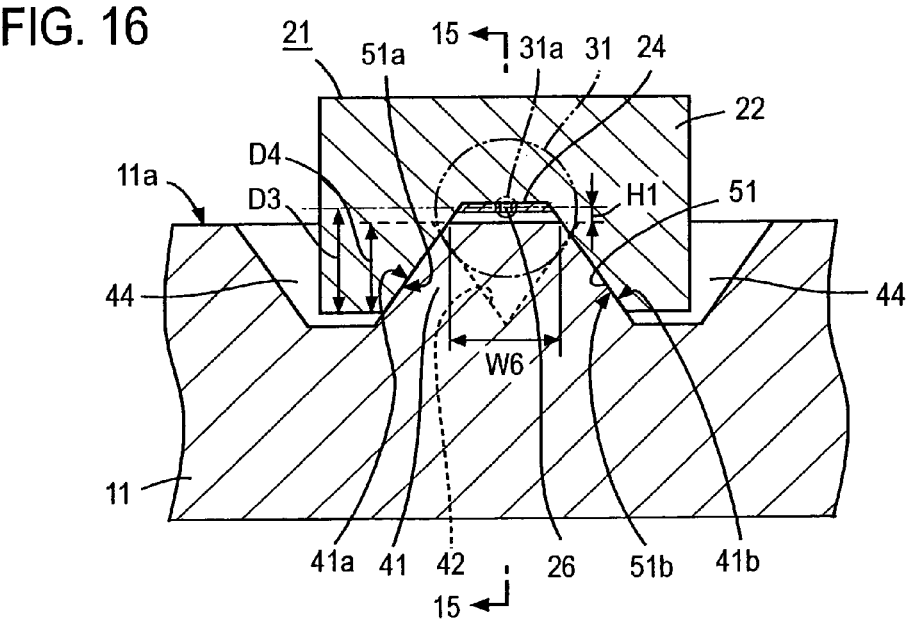
FIG. 16 is a sectional view taken along the line 16-16 in FIG. 15.

FIGS. 15 and 16 are sectional views of this embodiment which correspond to FIGS. 4 and 5, respectively. The platform 11 has on its mounting surface 11a a convex element mounting portion 41 for engagement with the optical element chip 21. That is, a concavity 51 is formed in one side of the chip body 22 of the optical element chip 21 and the optical element is formed on the bottom of the concavity 51. By engagement between the concavity 51 and the element mounting portion 42, the optical element chip 21 is mounted on the platform 11 and the optical element 24 is automatically positioned with respect to the mounting surface 11a. The optical element chip 21 is made of a light transmitting material for use in this optical element assembly.

At both sides of the element mounting portion 41 of the mounting surface 11 part receiving recesses 42 and 43 are extended in opposite directions, which receive end portions of the optical fibers 31 and 32, respectively. The cores 31a and 32a of the optical fibers 31 and 32 are automatically positioned by the grooves 42 and 43 with respect to the mounting surface 11a.

Figure 17:
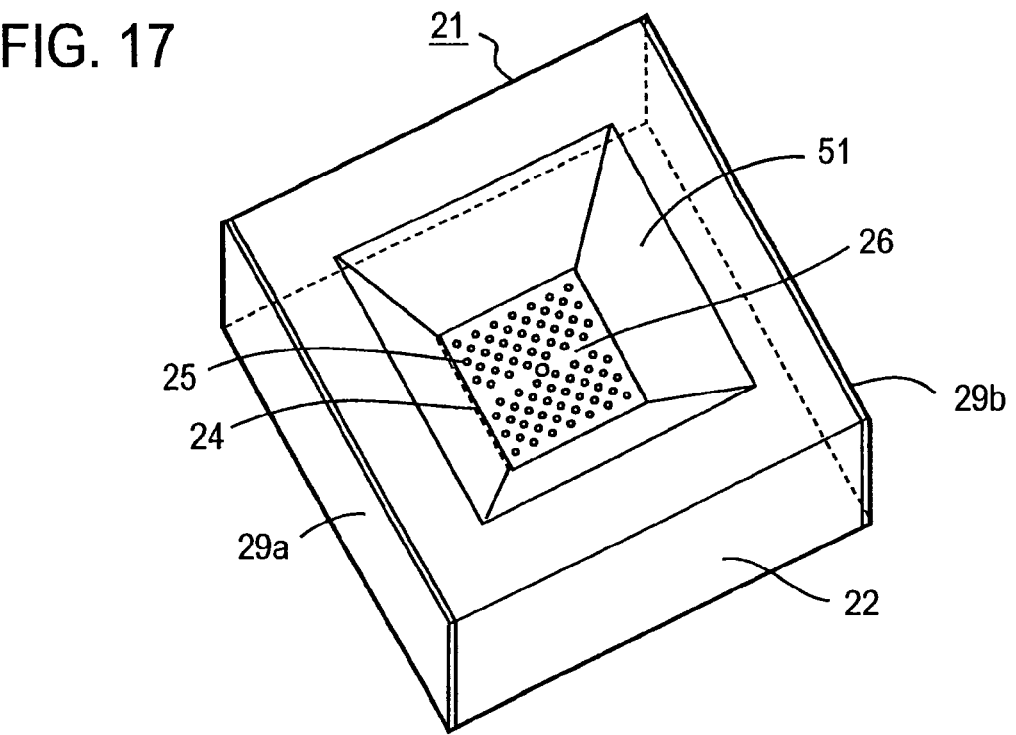
FIG. 17 is a perspective view of the optical element chip in the FIG. 15 embodiment.
Figure 19:
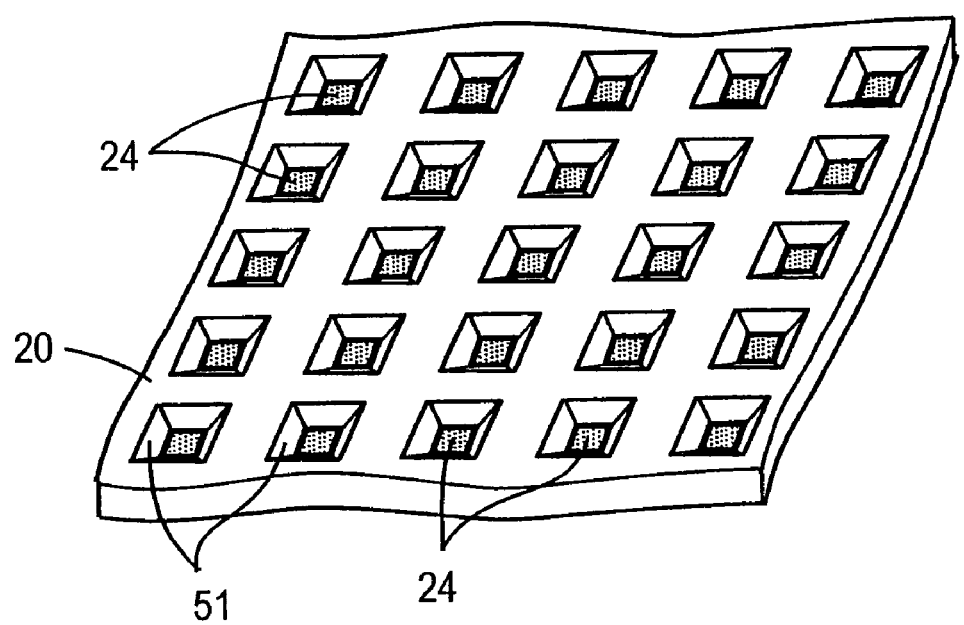
FIG. 19 is a perspective view showing one part of the wafer on which a there are formed a number of optical element chips shown in FIG. 17.

FIG. 17 shows an example of the optical element chip 21 for use in this embodiment. In one side of the chip body 22 there is formed the concavity 51 whose inside shape is an inverted pyramidal frustum and on the bottom of which is formed a photonic crystal optical element 24 having two-dimensional periodic arrays of air holes in the high refractive index material layer and the wavelength selective optical waveguide 26 as depicted, for example, in FIG. 3. Such optical element chips 21 can be mass-produced by the same method as referred to previously with reference to FIG. 6. In this instance, as depicted in FIG. 19, many concavities are formed in the single crystal silicon wafer by anisotropic etching through square masks, and the photonic crystal element 24 is formed on the bottom of each concavity 51. The cross section of each concavity 51 perpendicular to the wafer 20 is an inverted pyramidal frustum. The wafer 20 is cut into individual optical elements 21 each having the optical element 24.

FIG. 19 illustrates an example of the platform 11 for use in this embodiment. In the central portion of the mounting surface 11a there are formed a square-frame-like groove 44 of a cross section just like an inversion of a pyramidal frustum and a pyramidal frustoidal convexity or protrusion surrounded by the groove 44, that is, the element mounting portion 41 is formed. On the line bisecting the element mounting portion 41 there are formed in the platform 11 V-grooves, as the parts receiving grooves, that extend from both sides of the element mounting portion 41 and communicate with the square-frame-like groove 44. The platform 11 is formed of single crystal silicon, for instance, and the element mounting portion 41 and the part receiving recesses 42 and 43 can easily be formed by anisotropic etching.

As depicted in FIG. 16, opposed side surfaces 41a and 41b of the element mounting portion 41 and opposed wall surfaces 51a and 51b of the concavity 51 of the optical element chip 21 make surface-to-surface contact with each other at the place where the spacing between the opposed wall surfaces 51a and 51b is equal to the width W6 of the protruding end face of the element mounting portion 41 between the opposed pair of its side surfaces 41a and 41b. By this, the element mounting portion 41 and the concavity 51 are engaged with each other. Let H1 represent the height (distance) of the optical element 24 with respect to the mounting surface 11. The optical fibers 31 and 32 are positioned by the part receiving recesses 42 and 43. Let H2 represent the height (distance) of the optical fiber cores 31a and 32a with respect to the mounting surface 11a. The depth of the V-grooves 42 and 43, or the depth D3 of the concavity 51 is set such that the difference between the depth D3 of the concavity and the depth D4 where the spacing the wall surfaces 51a and 51b becomes W6 is H1 and that H1 is equal to H2. The center lines of the part receiving recesses 42 and 43 are aligned with the center line between the side surfaces 41a and 41b of the element mounting portion 41.

With the above structure, light having propagated through the one optical fiber 31 enters the optical element 24, in particular, the wavelength selective optical waveguide 26, and a particular wavelength component passes through the optical element 24 and enters the other optical fiber 32.

Since the optical element 24 is formed on the bottom of the concavity 51, the reference point for the position of its formation is the same as the reference point for the position of forming the concavity 51, enabling the optical element 24 to be positioned with respect to the concavity 51 with high accuracy. When the optical element chip 21 is fitted in the element mounting portion 41, the optical element 24 is automatically positioned with respect to the mounting surface 11a with a very high degree of accuracy as in Embodiment 1. Similarly, when the optical fibers 31 and 32 are mounted in the part receiving recesses 42 and 43, the fiber cores 31a and 32a are automatically positioned with respect to the mounting surface 11a with high accuracy. Accordingly, the optical element 24 and the optical fibers 31 and 32 are optically coupled with high accuracy. It will readily be understood that this embodiment produces the same operation/working-effect as is obtainable with Embodiment 1. It is desirable to form anti-reflection films 29a and 29b on the outer side surfaces of the optical element chip 21 facing the optical fibers 31 and 32, respectively.

The optical element 24 that is formed on the bottom of the concavity 51 of the optical element chip 21 may be the photonic crystal optical waveguide element shown in FIG. 12, a photonic crystal laser, or the vertical-cavity surface-emitting laser of a compound semiconductor described previously with respect to Embodiment 5. According to the kind or type of the optical element 24 used, the structure of the element mounting portion 41 of the platform 11, that is, the structure and arrangement of the part receiving recesses for mounting optical parts such as optical fibers and microminiature lenses are modified accordingly.

MODIFICATIONS

Figure 20:
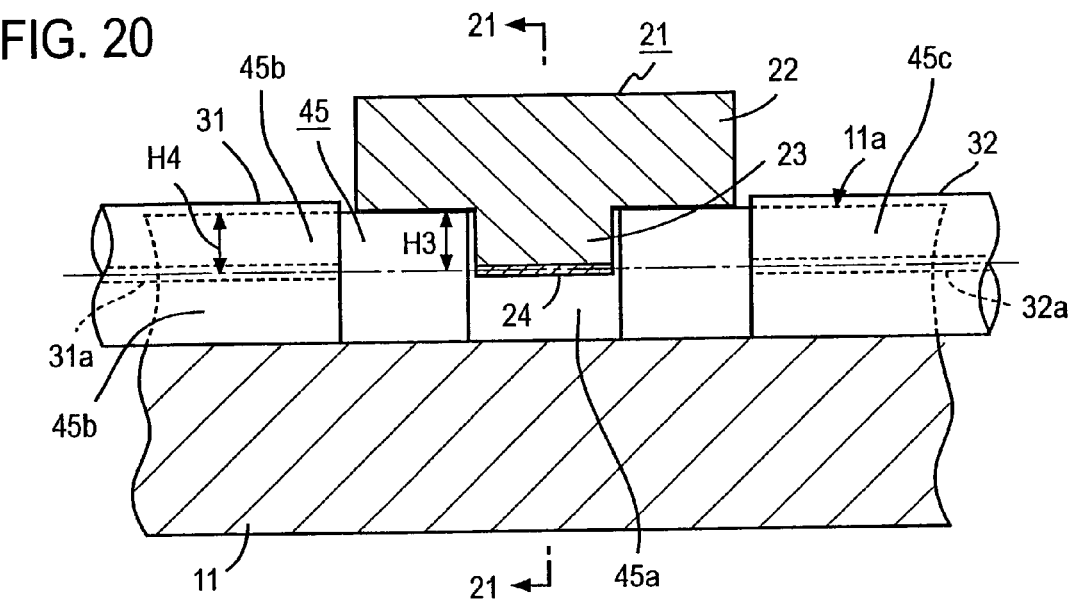
FIG. 20 is a sectional view taken along the line 20-20 in FIG. 21.
Figure 21:
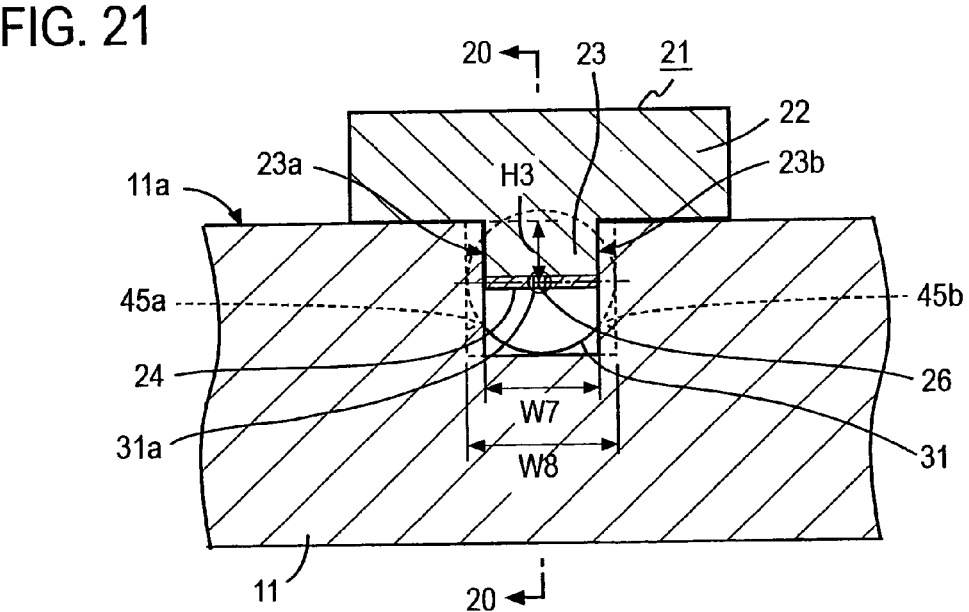
FIG. 21 is a sectional view taken along the line 21-21 in FIG. 20.

The cross section of the optical element chip 21 perpendicular to the protruding end face of the convexity 23 need not always be frustoidal but may also be square; that is, the convexity 23 may be a short-axis quadrangular prism. This will be described below with reference to FIGS. 20 and 21 in which the optical element 24 is a wavelength selective optical waveguide. FIGS. 20 and 21 correspond to FIGS. 4 and 5, respectively. Unlike in FIGS. 4 and 5, the convexity 23 of the optical element 24 is a short quadrangular prism; accordingly, the V-grooves each are replaced with a square-sectioned groove 45, the width W7 of its central portion is narrowed to form an element mounting portion 45a, and those portions of each groove 45 which extend outwardly of the central portion and have a width W8 wider than W7 are used as part receiving recesses 45b and 45c. The width W7 is chosen equal to the spacing W9 between the opposed side surfaces 23a and 23b of the convexity 23 so that the optical element chip 21 is mounted on the platform 11 with the convexity 23 fitted in the element mounting portion 45a. The length of protrusion H3 of the convexity 23 is set with reference to its protruding end face, and the chip body 22 is abut against the mounting surface 11a of the platform 11.

The optical fibers 31 and 32 are positioned in the part receiving recesses 45b and 45c, respectively. That is, peripheral surfaces of the optical fibers 31 and 32 make line-to-line contact with the bottoms of the part receiving recesses 45b and 45c and edges of the square grooves near the mounting surface 11a, respectively, by which the optical fibers are positioned with respect to the mounting surface 11a. In this case, the distance H of each of the fiber cores 31a and 32a to the mounting surface 11a is equal to the distance H3 between the optical element 24 and the mounting surface 11a, and the fiber cores 31a and 32a are disposed opposite the optical element 24, in particular, the light inlet and outlet ports of the wavelength selective optical waveguide 26.

The convexity 23 of each optical element chip 21 can be formed, for example, by dry etching during mass-production of optical element chips, and the part receiving recesses 45a, 45b and 45c can also be formed by dry etching in the platform 11.

Figure 18:
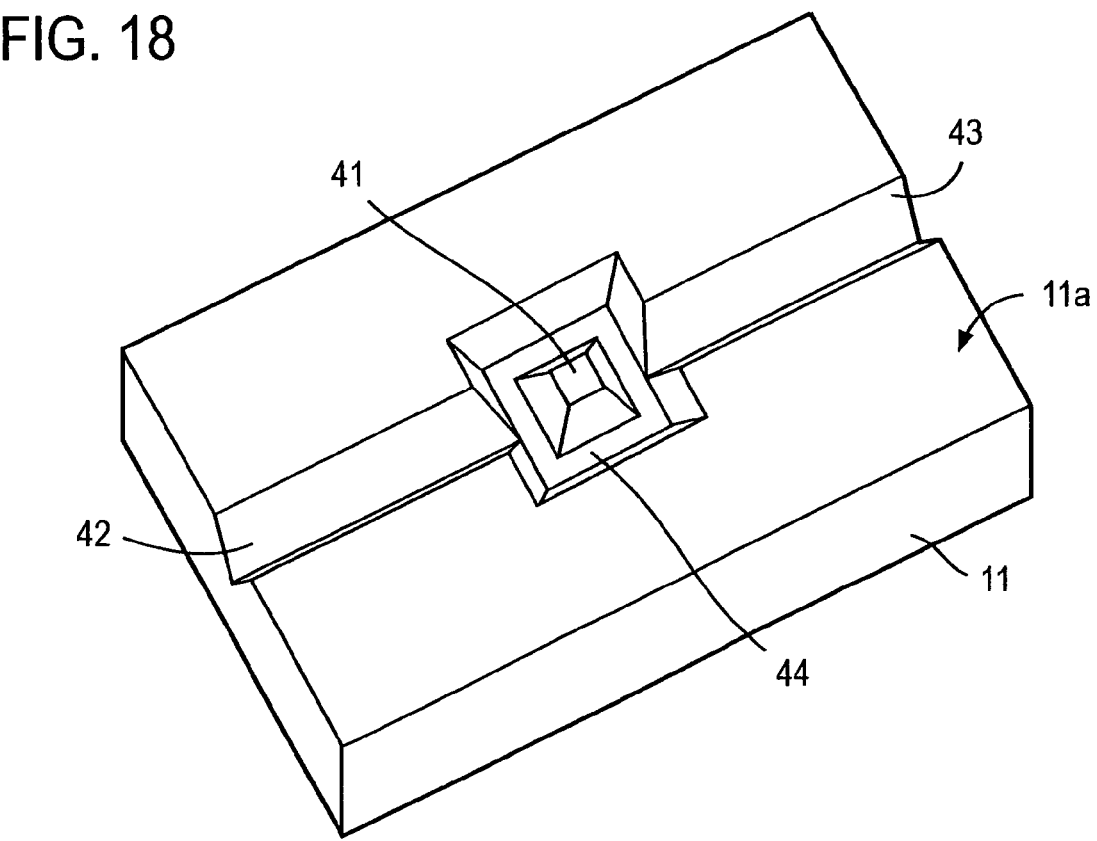
FIG. 18 is a perspective view of a platform used in the FIG. 15 embodiment.
Figure 22:
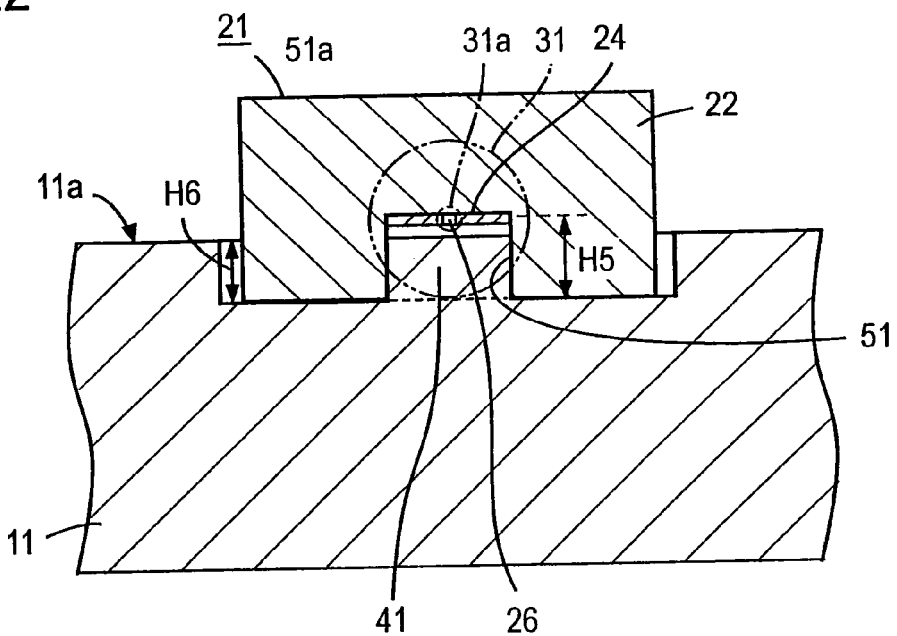
FIG. 22 is a sectional view, corresponding to FIG. 16, of another embodiment using an optical element chip having an optical element formed in a concavity.
Figure 23:
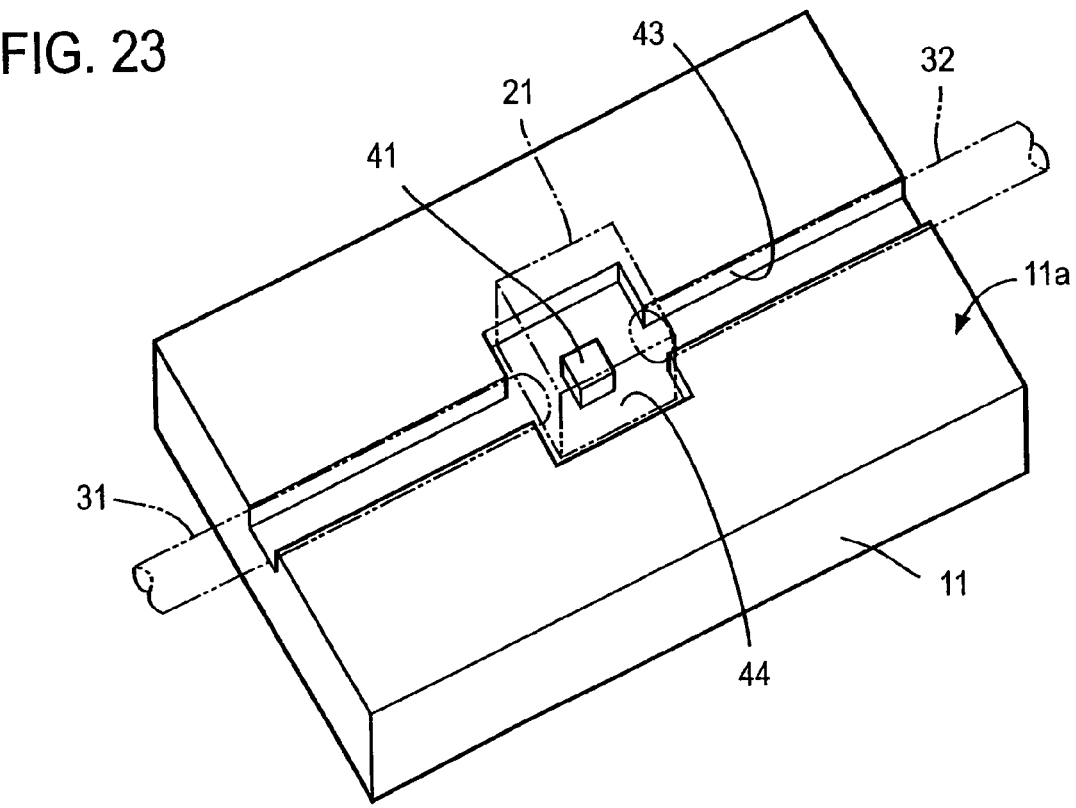
FIG. 23 is a perspective view showing an example of a platform used in FIG. 22.

The inside shape of the concavity 51 of the optical element chip 21 may be a quadrangular prism as shown in FIGS. 22 and 23, in which the optical element 24 is a wavelength selective optical waveguide. FIGS. 22 and 23 correspond to FIGS. 16 and 18, respectively. This example differs from Embodiment 6 in that the inside shape of the concavity 51 of the optical element chip 21 is a short quadrangular prism; accordingly, the convexity of the element mounting portion 41 is also a short quadrangular prism, and the chip body 22 is abut against the bottom of the groove 44. The part receiving recesses 42 and 43 are square in section, that is, both wall surfaces of each groove are perpendicular to the mounting surface 11a and the bottom of the groove is parallel to the mounting surface 11a. Four wall surfaces of the groove 44 are also perpendicular to the mounting surface 11a and the bottom of the groove 44 is also parallel to the mounting surface 11a. The peripheral surfaces of the optical fibers 31 and 32 make line-to-line contract with the bottoms of the part receiving recesses 42 and 43 and edges of their wall surfaces near the mounting surface 11a.

The depth H5 of the optical element 24 is set with reference to the bottom of the concavity 51, and the chip body 22 makes contact with the bottom of the frame-like groove 44 to determine the position of the optical element 24 with respect to the mounting surface 11a, and the depth H6 of the groove 44 is set with reference to the mounting surface 11a. The optical fibers 31 and 32 are positioned by the part receiving recesses 42 and 43 with respect to the mounting surface 11a, and dimensions of respective parts are set such that the optical fiber cores 31a and 32a are disposed opposite the light inlet and outlet ports of the optical element 24, in this example, light inlet and outlet ports of the wavelength selective optical waveguide, that is, such that their optical axes are aligned with each other.

In the case of the optical element 24 providing with the convexity 23 or concavity 51, too, the optical element 24 may be an optical waveguide, vertical-cavity surface-emitting element, or the like. The optical part may also be a microminiature lens, or the like.

While in the above the optical element chip 21 and the platform 11 have each been described to be formed of single crystal silicon, they may be made of GaAs, crystal, ceramics, glass, or plastics. In the case of forming a concavity in the optical element chip 21, the material needs to be transparent to light of the working wavelength band of the optical element assembly, such as the optical communication wavelength band. The convexity or concavity of the optical element chip and the element mounting part and the part receiving recesses of the platform can be formed by dry etching of the above-mentioned materials. In particular, in the case of single crystal GaAs or crystal, anisotropic etching based on its crystal orientation can also be used. The platform can be formed by molding of the plastic material. In the case of using silicon and glass for the optical element chip and the platform, they may also be fused together. In the present invention, the optical element assembly may be one that has the optical element chip mounted on the platform or one that has the optical parts mounted on the platform. While in the above the present invention has been described to form the optical element chip and the platform by means of photolithography, ultraviolet rays lithography or electron beam lithography.

What is claimed is:

1. An optical element assembly in which an optical part is mounted on a platform for optical coupling to an optical element of an optical element chip mounted on said platform, wherein:

said optical element chip has said optical element formed on the bottom of a concavity in one side of a chip body;

a convexity is formed as an element mounting portion on a mounting surface of said platform on which said optical part is to be mounted;

said optical element chip is mounted on said mounting surface with said concavity of said optical element chip engaged with said convexity of said element mounting portion so that said optical element is positioned with respect to said mounting surface; and said optical part is positioned with respect to said mounting surface and mounted thereon, and a part receiving recess is formed in said mounting surface of said platform to establish optical coupling between said optical part and said optical element; wherein: the position of said optical element with respect to said mounting surface is a position which is determined by surface-to-surface contact between a pair of opposed side surfaces of said concavity and a pair of opposed wall surfaces of said element mounting portion and where said optical element is parallel to said mounting surface in the direction of arrangement of said side surfaces and said wall surfaces; and the position of said optical part with respect to said mounting surface is a position which is determined by contact between opposed wall surfaces of said part receiving recess, which are parallel to said pair of opposed wall surfaces of said element part, respectively, and said optical part in the direction of arrangement of said pairs of opposed wall surfaces.

2. The optical element assembly of claim 1, wherein: said element mounting portion is a quadrangular frustoidal portion surrounded by a square-frame-like V-groove formed in said mounting surface; the height of said optical element from said mounting surface is determined by the width of said protruding end face of said convexity of said element mounting portion between marginal edges of said pair of side surfaces of said convexity; said optical element is parallel to said mounting surface; said part receiving recess has opposed wall surfaces parallel to a direction perpendicular to the direction of arrangement of said opposed side surfaces of said element mounting portion; and the height of the optical axis of said optical part from said mounting surface is determined by said contact between said opposed wall surfaces of said part receiving recess and said optical part.

3. The optical element assembly of claim 2, wherein said part receiving recess is a V-groove.

* * * * *